May 26, 1925.
E. H. THOMPSON ET AL
TRANSFER ISSUING MACHINE
Original Filed Jan. 3. 1920    19 Sheets-Sheet 1
1,539,382
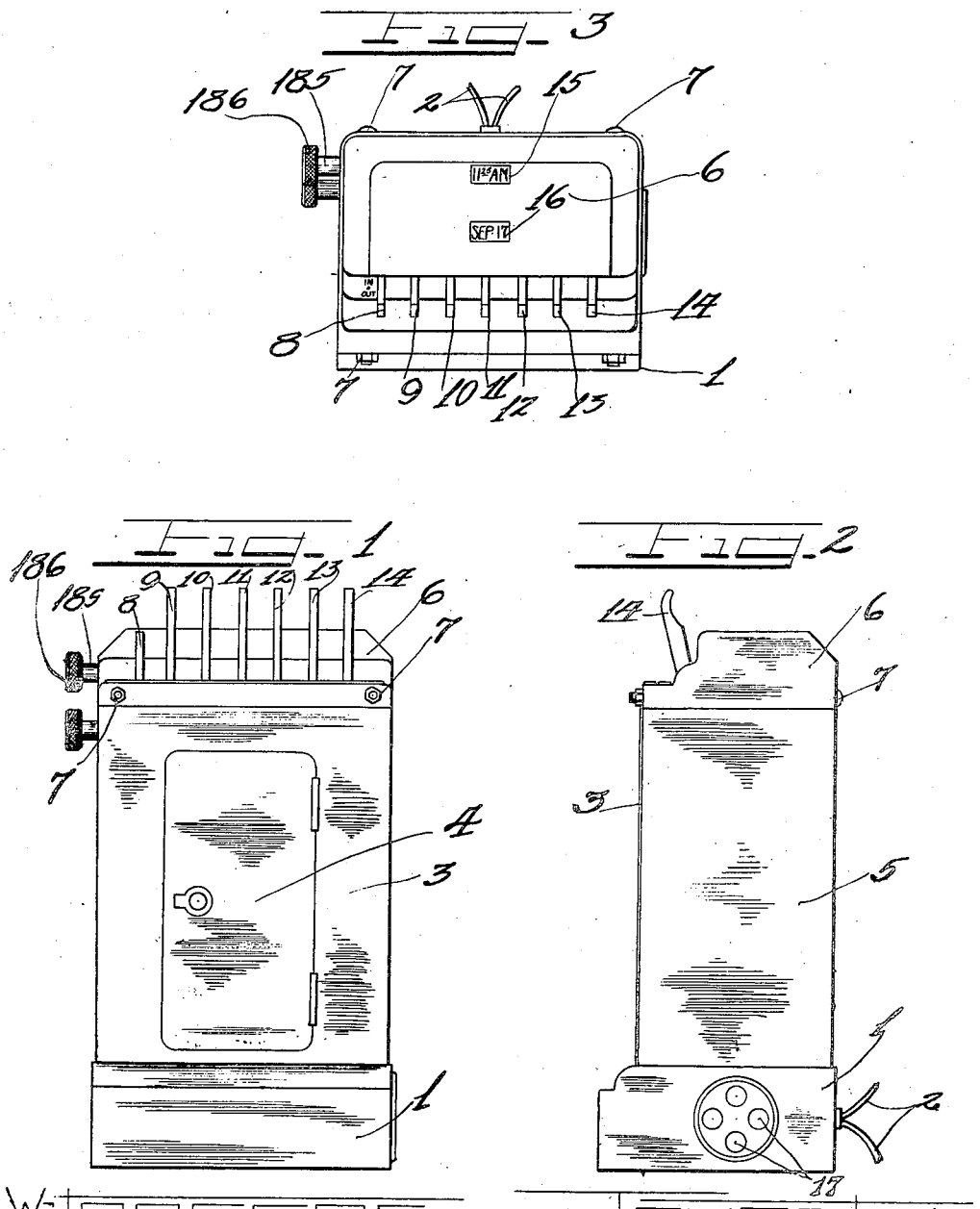

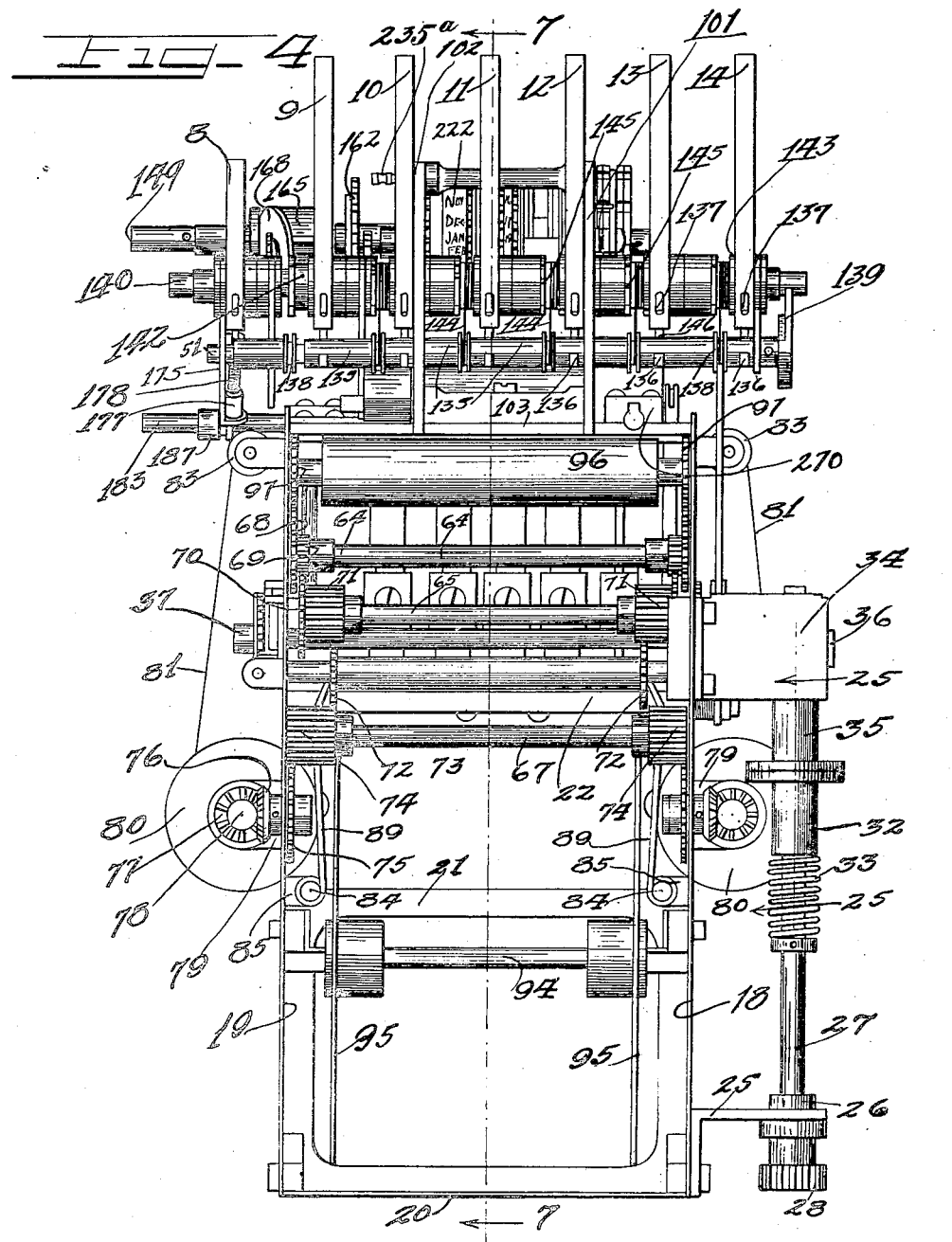

May 26, 1925.
E. H. THOMPSON ET AL
1,539,382
TRANSFER ISSUING MACHINE
Original Filed Jan. 3, 1920     19 Sheets-Sheet 3
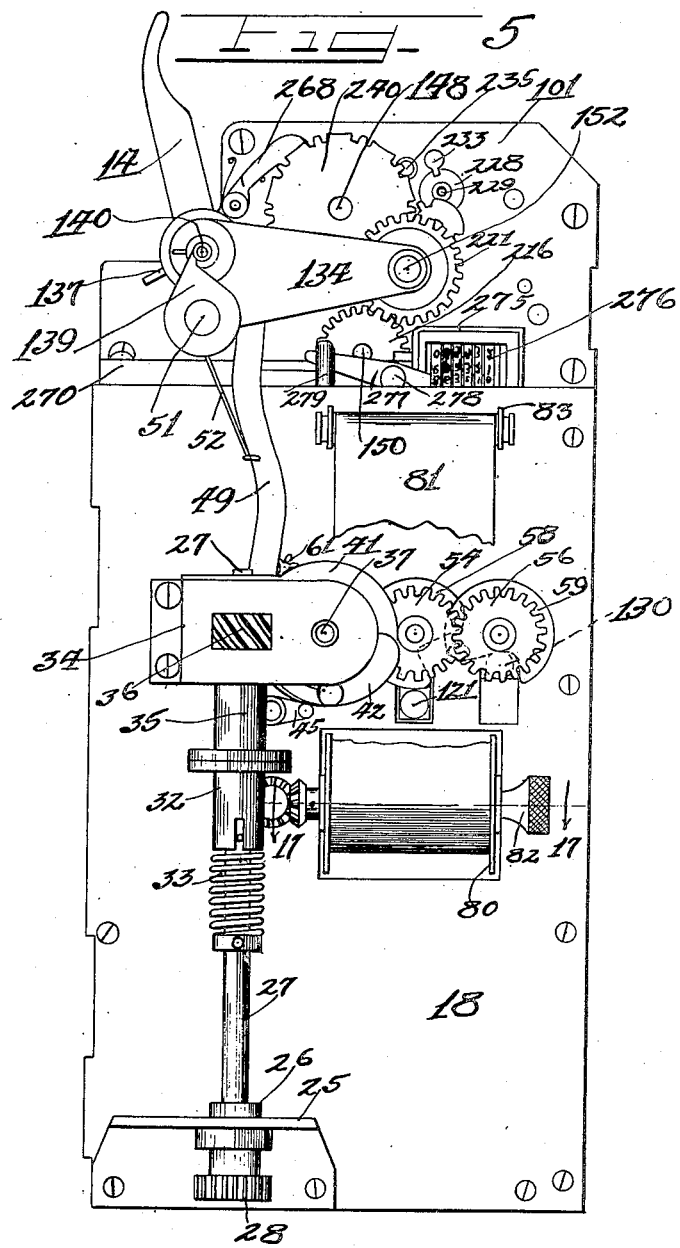

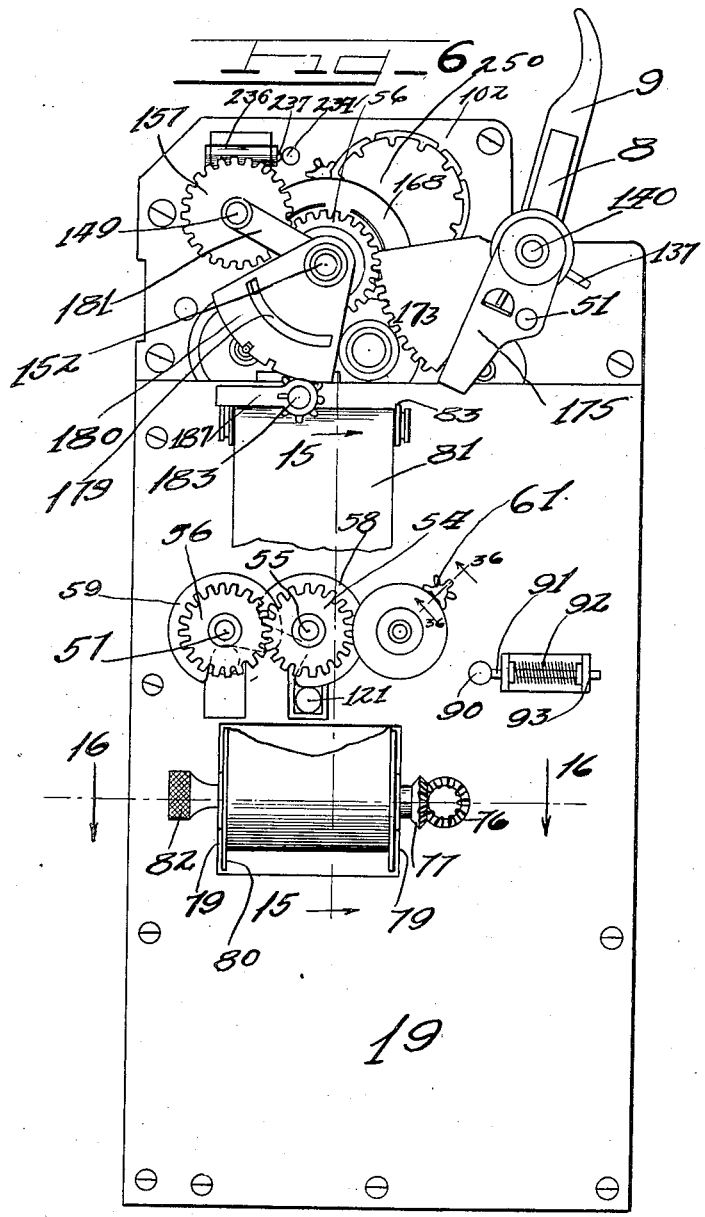

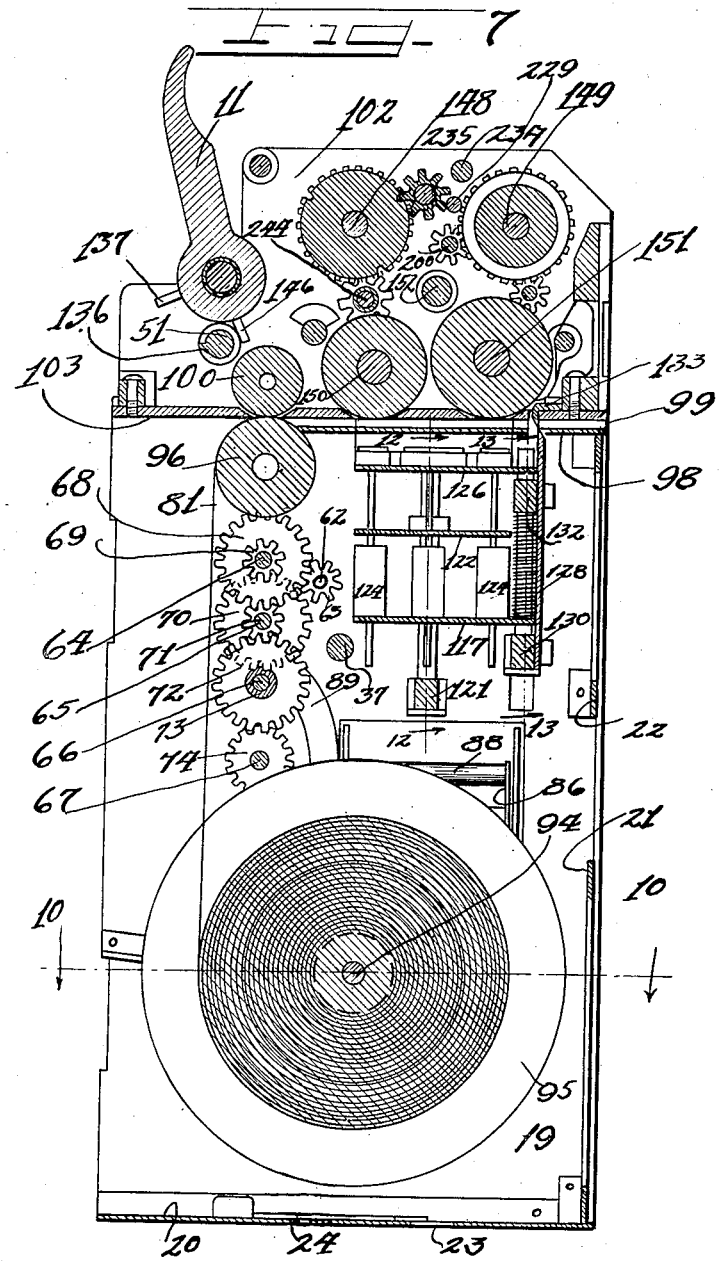

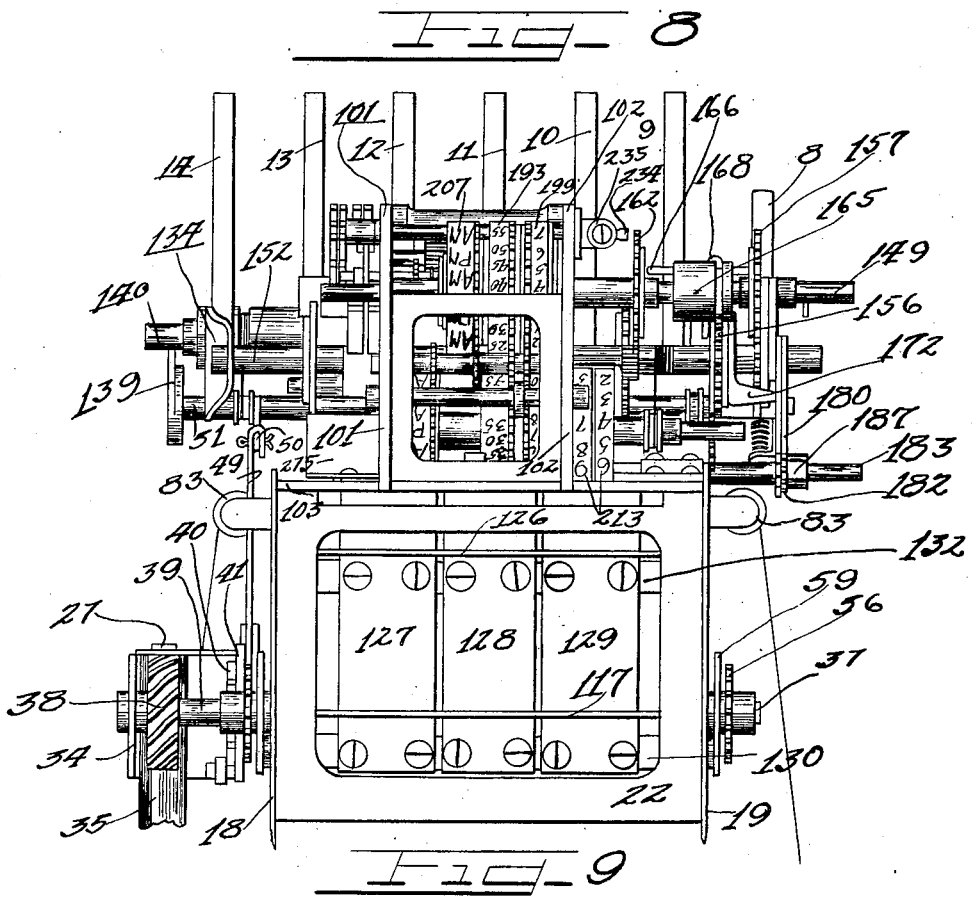

May 26, 1925.  
E. H. THOMPSON ET AL  
TRANSFER ISSUING MACHINE  
Original Filed Jan. 3, 1920

WITNESSES  
N. G. Diarks  
Charles W. Kellogg

INVENTORS  
Hugo J. Baur  
Ernest H. Thompson  
By Charles W. Niles  
Atty.

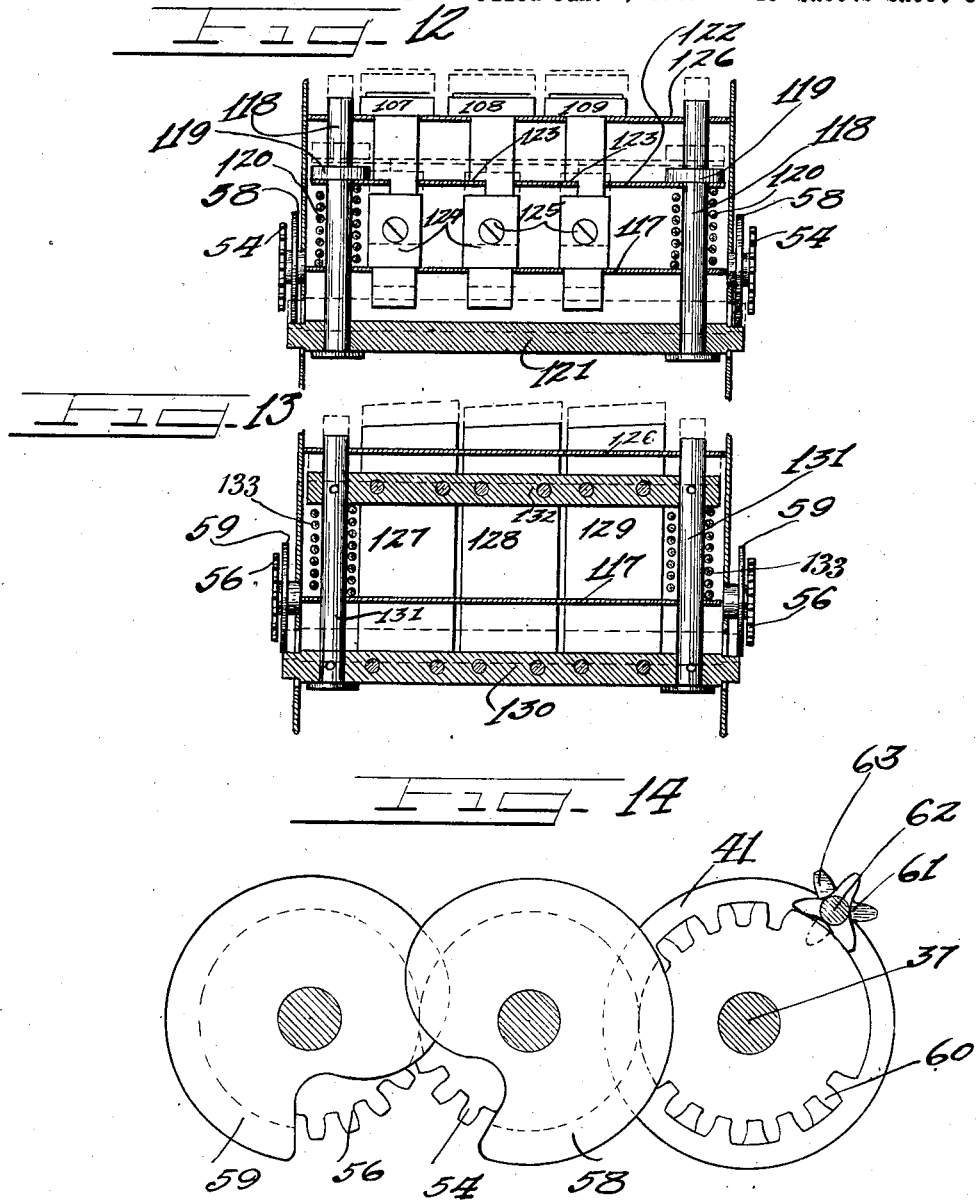

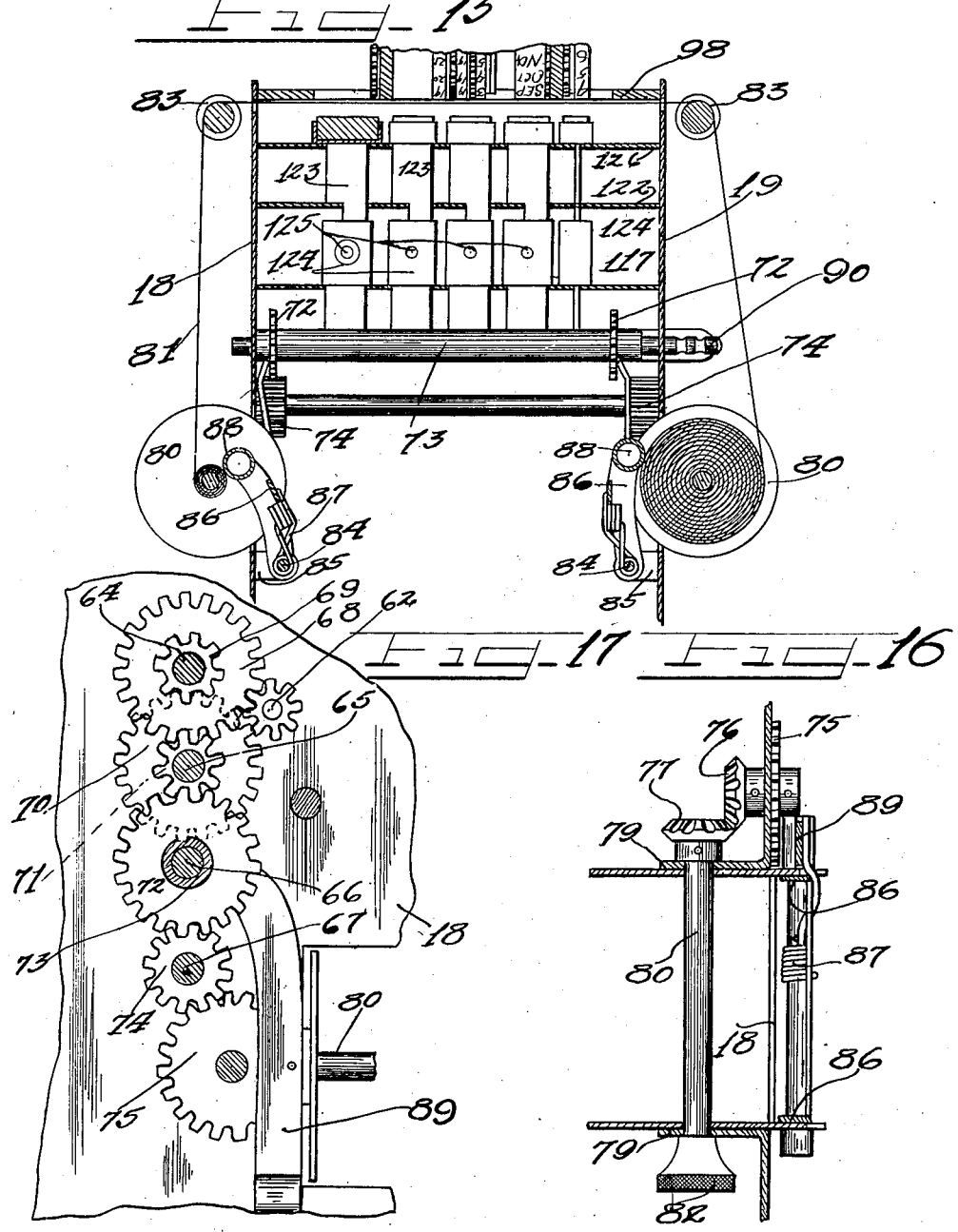

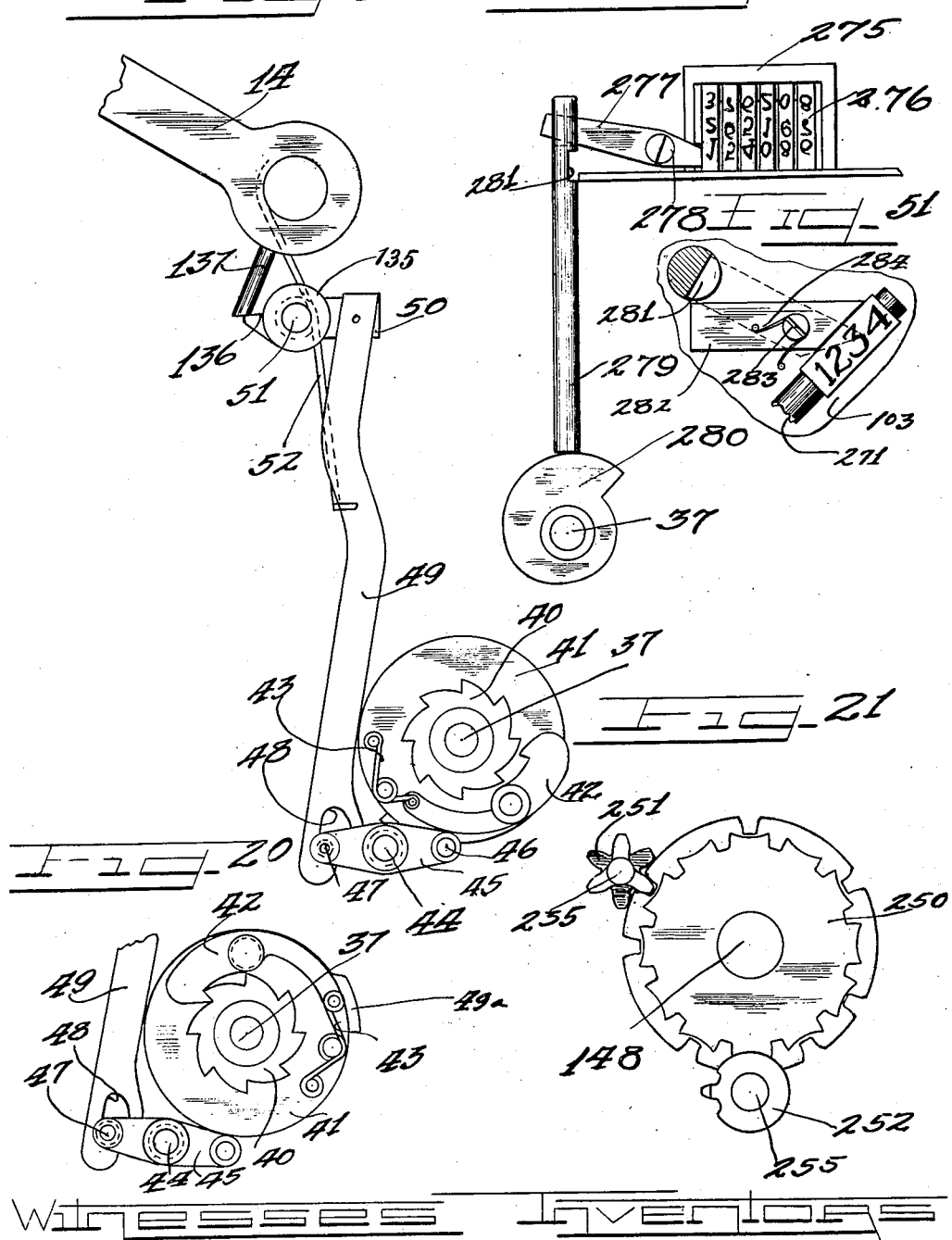

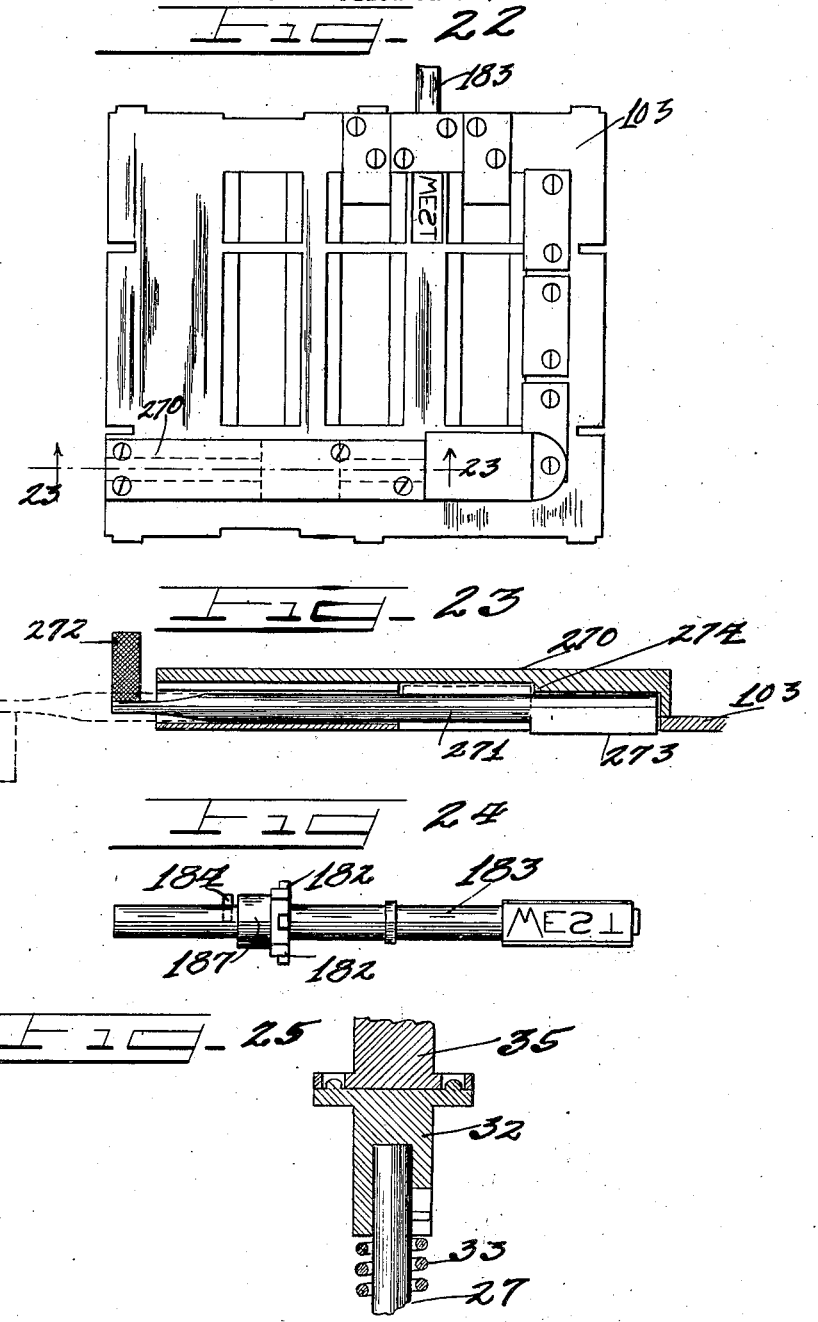

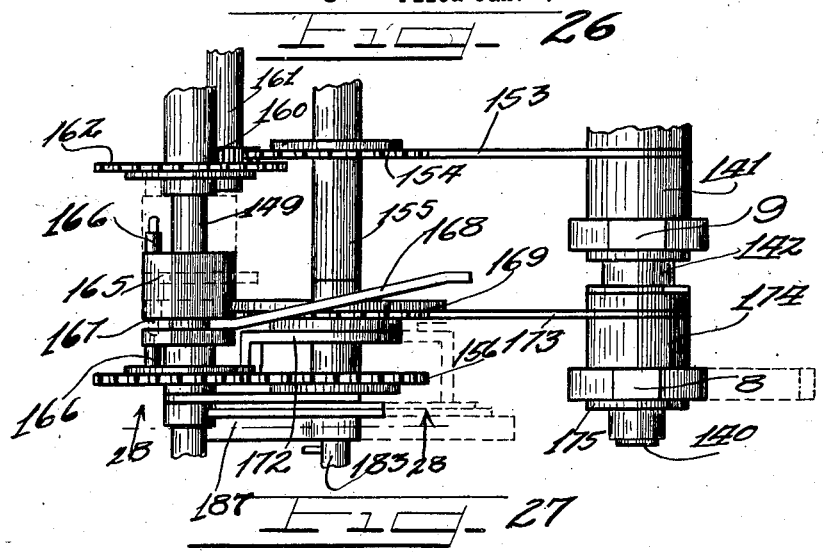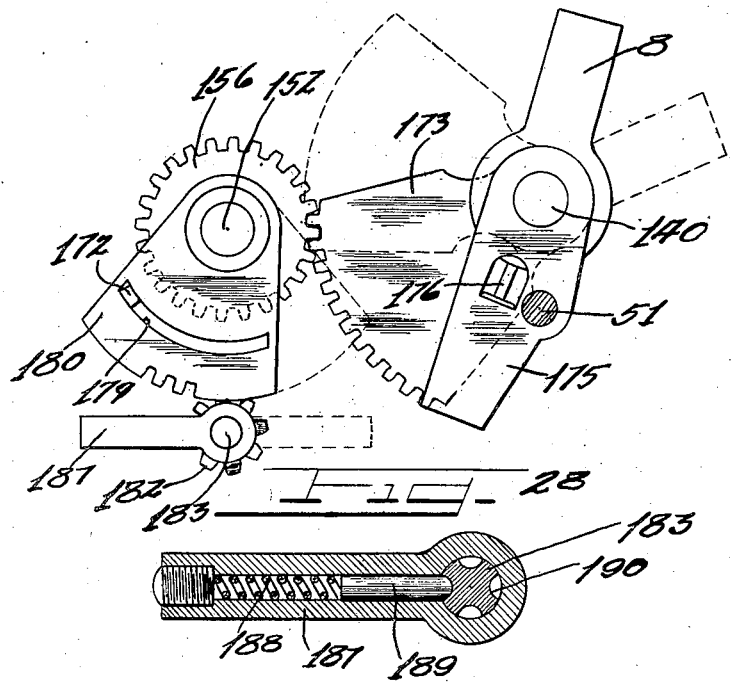

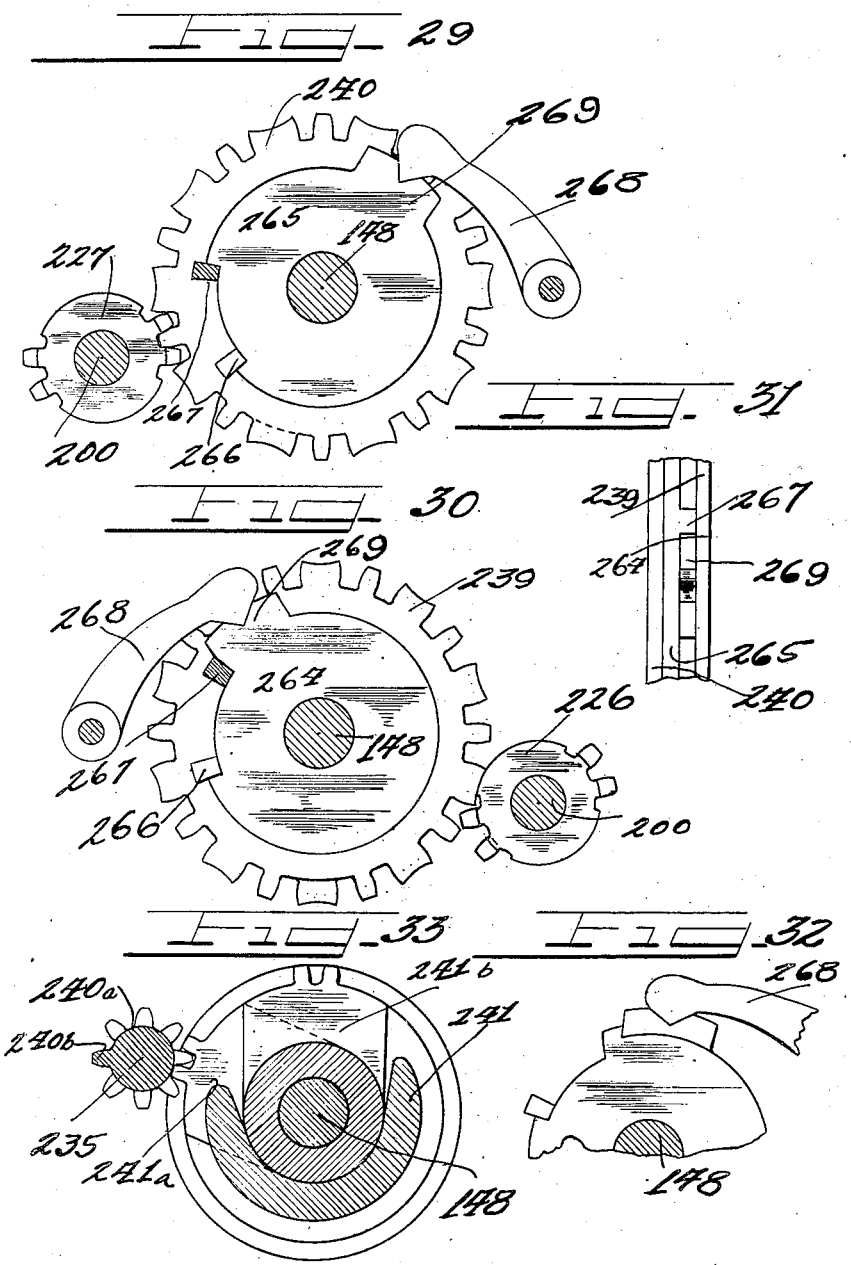

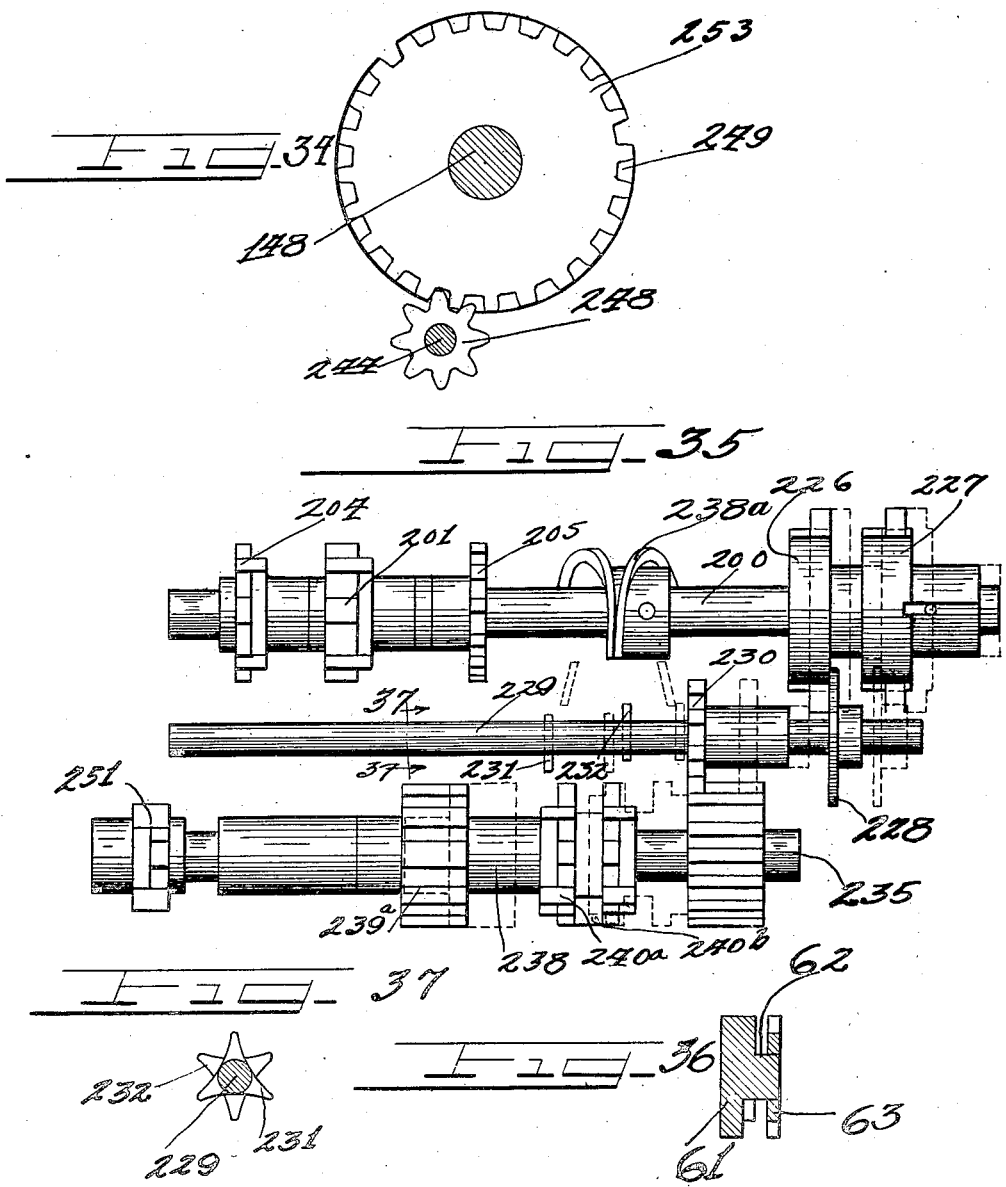

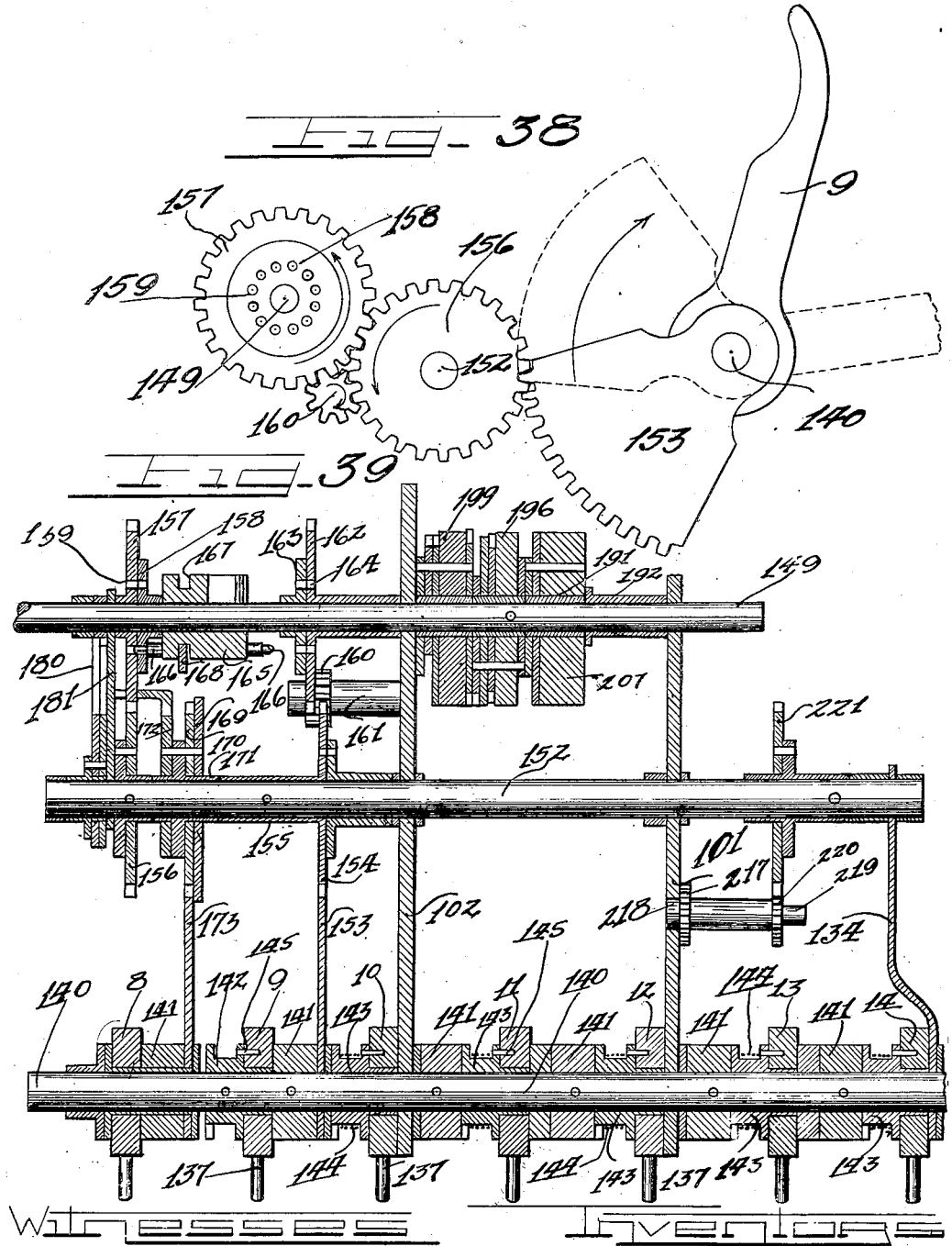

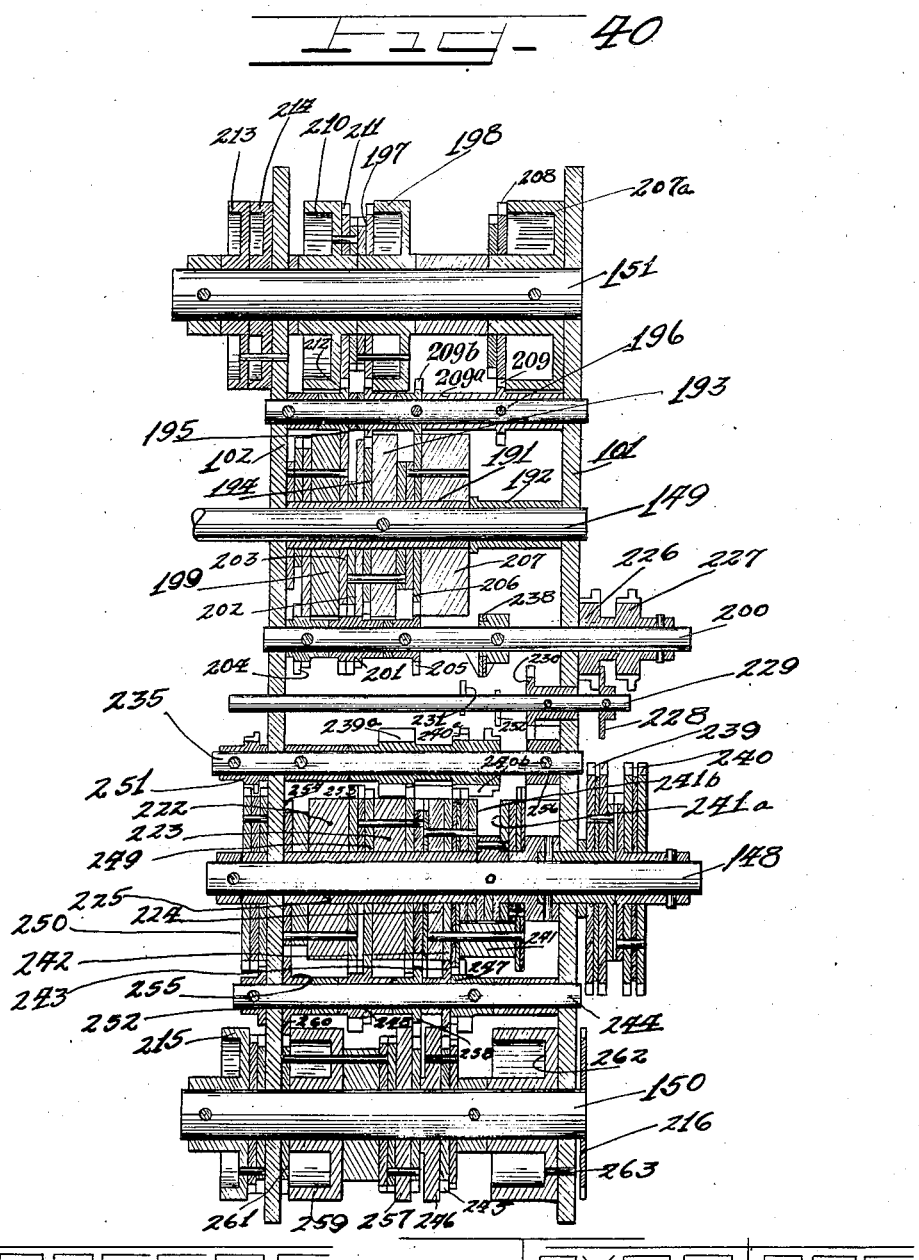

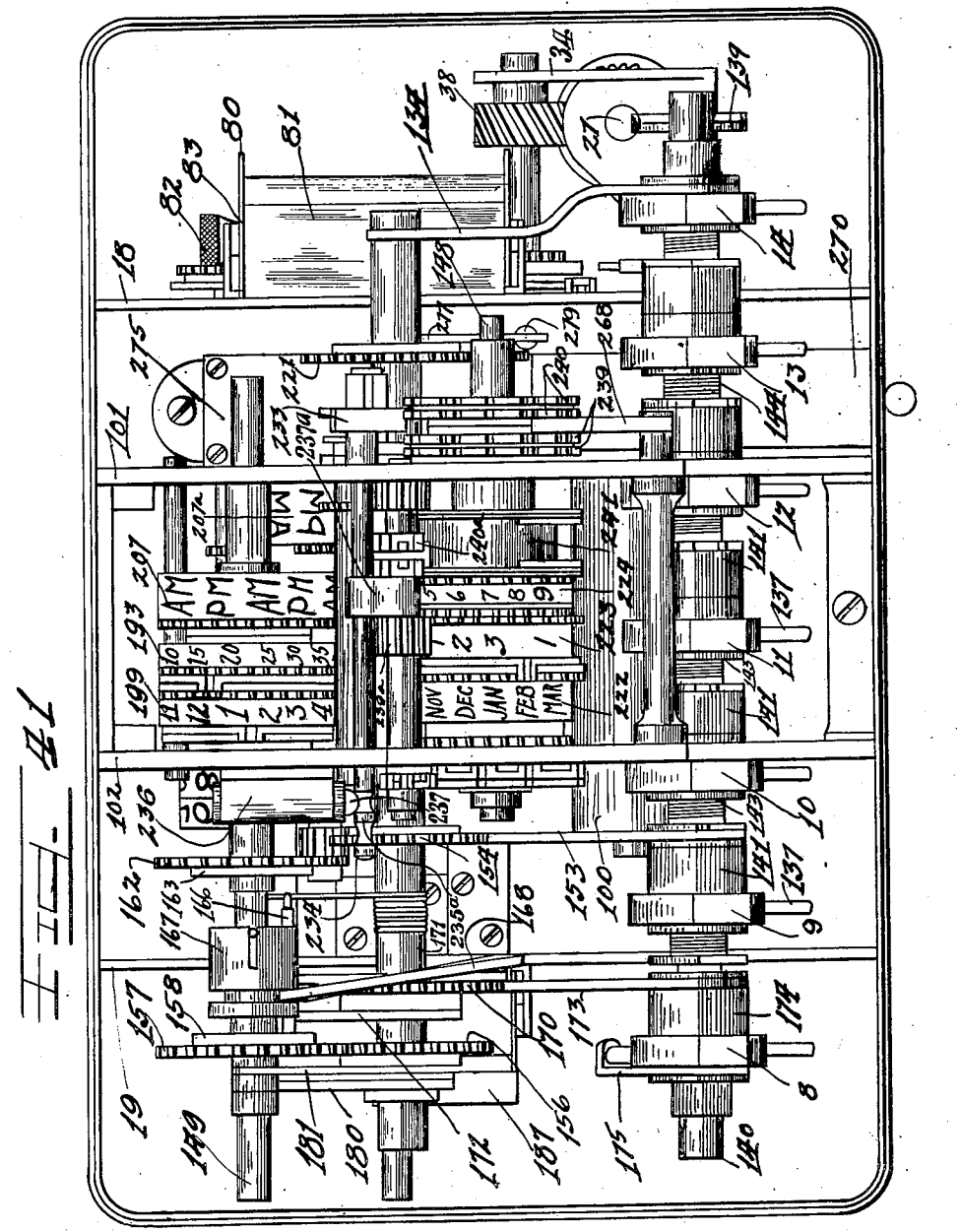

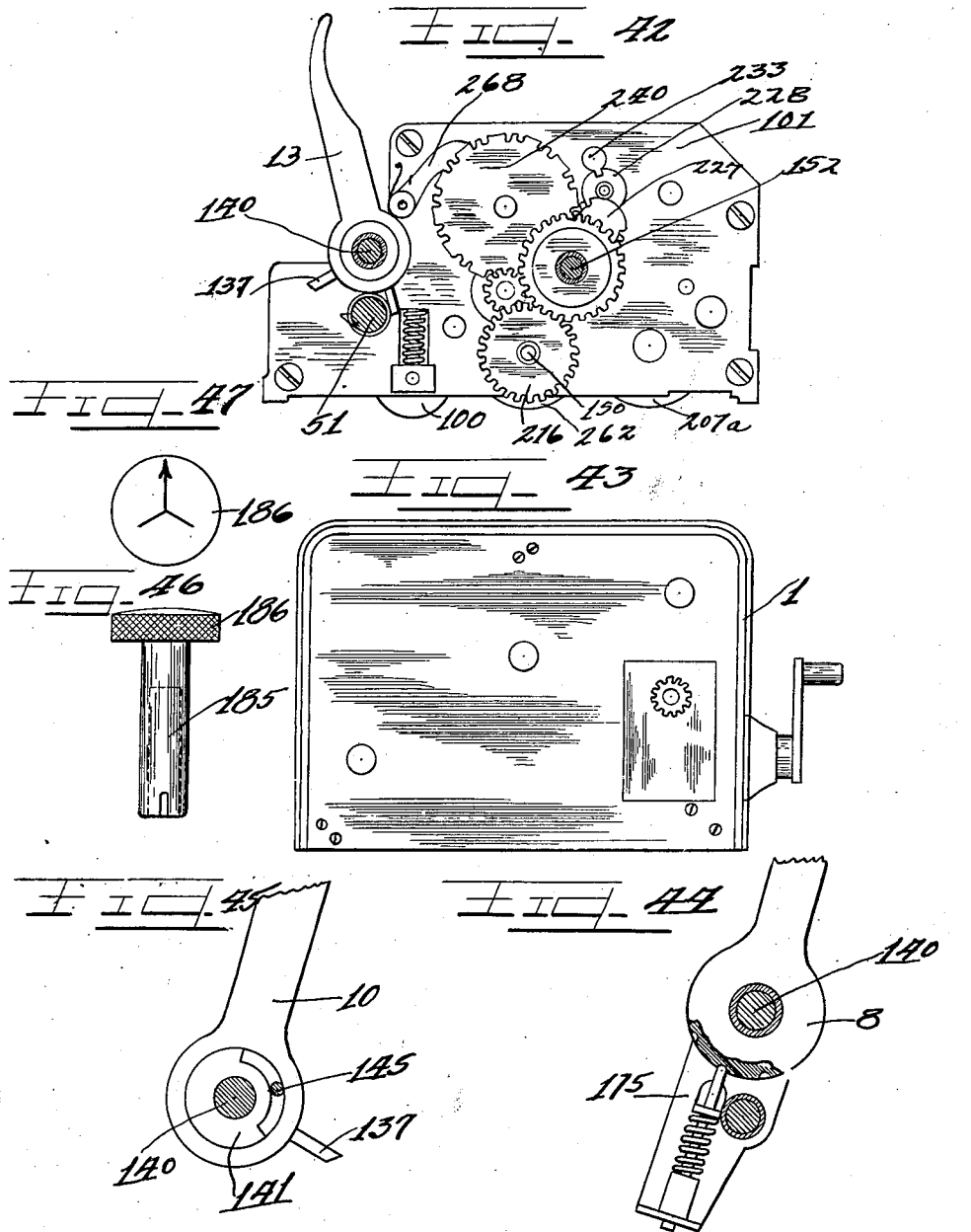

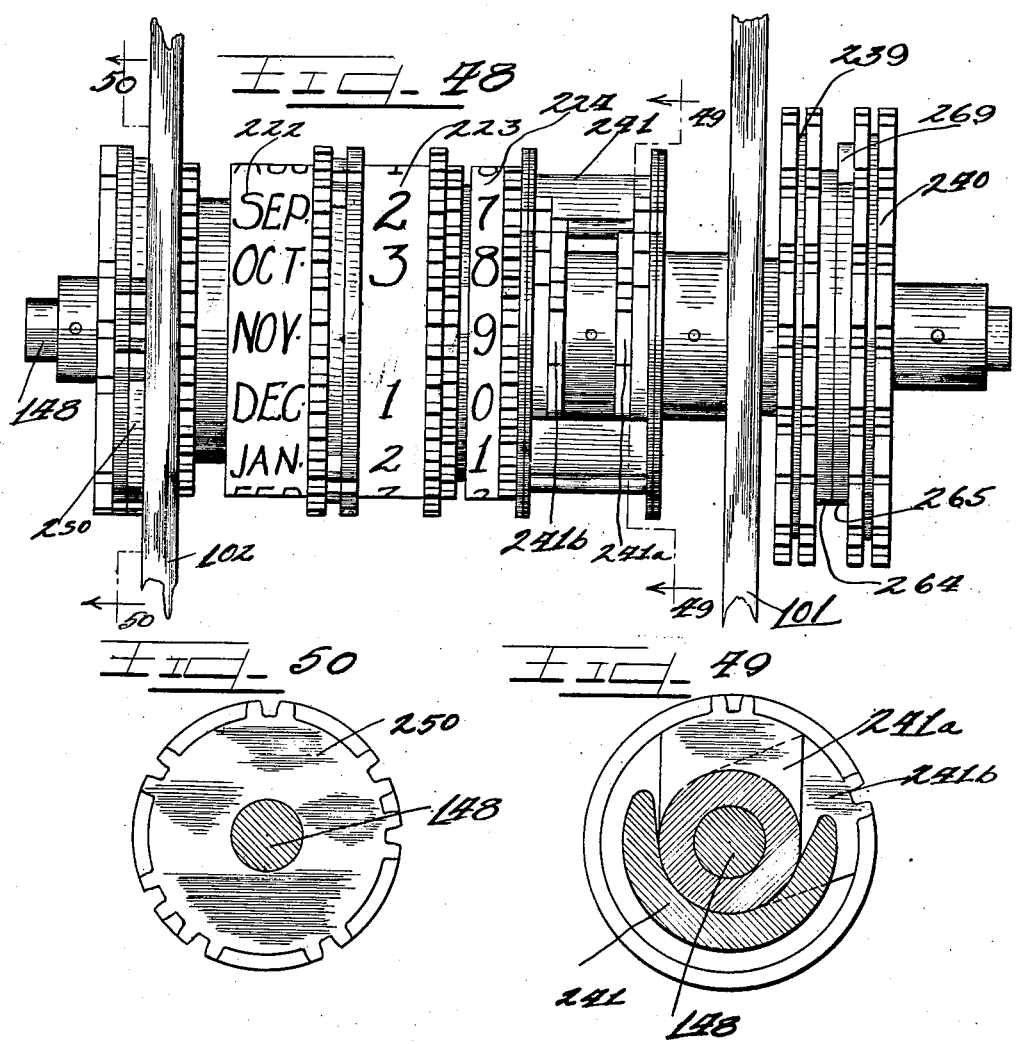

Patented May 26, 1925.

1,539,382

UNITED STATES PATENT OFFICE.

ERNEST H. THOMPSON AND HUGO J. BAUR, OF CHICAGO, ILLINOIS, ASSIGNORS TO JOHNSON FARE BOX COMPANY, OF CHICAGO, ILLINOIS, A CORPORATION OF NEW YORK.

TRANSFER-ISSUING MACHINE.

Application filed January 3, 1920, Serial No. 349,323. Renewed November 7, 1924.

*To all whom it may concern:*

Be it known that we, ERNEST H. THOMPSON and HUGO J. BAUR, citizens of the United States, and residents of the city of Chicago, in the county of Cook and State of Illinois, have invented certain new and useful Improvements in Transfer-Issuing Machines; and we do hereby declare that the following is a full, clear, and exact description of the same, reference being had to the accompanying drawings, and to the numerals of reference marked thereon, which form a part of this specification.

This invention relates to a zone receipt issuing machine adapted for use on traction lines where zone systems are in use—whereby a passenger entering a car may receive a slip of paper denoting the zone and time at which he boarded the car in order that the correct fare may be collected from him upon his leaving the car.

This invention, moreover, may be used as a transfer issuing machine adapted to issue transfers for individual use such as on street car or railroad transportation lines, and with each transfer stamped in a particular manner by the impression mechanisms to identify the transfer both from its issue source and also for the point or zone at which the same is to be used.

The invention contemplates the use of power driven mechanisms with the transfer impressing and issuing mechanisms constantly in readiness to properly stamp and issue a transfer according to the operation of the machine as controlled by the operator, it only being necessary for the operator to move a particular lever in accordance with the zone in which the transfer is to be used to set in operation all the mechanisms of the machine which stamp the transfer, partially sever the same from a continuous strip of paper and present it in an easily accessible position for ready acceptance and detachment by the person receiving the same.

It is an object, therefore, of this invention to provide a transfer issuing machine which by operation of its mechanisms serves to impress and issue a transfer with the following information: Line No.—Time—Direction—Zone for use—Date—Conductor's No.—Serial No. and Name of Traction Co. issuing the same.

It is also an object of this invention to provide a transfer issuing machine within which a roll of paper is mounted which is fed into the field of operation of the machine to receive identifying and descriptive marks impressed thereon and thereafter, for issue, is advanced so that the impressed portion constituting a transfer, is fed outwardly from the machine and partially severed from the main strip of material so as to be easily detached therefrom by the person to whom the transfer is issued.

It is a further object of this invention to provide a transfer issuing machine having a plurality of zone levers whereby the operator may issue a transfer for use in any particular zone desired, marked upon the transfer issued, and with the zone levers interconnected with a time stamping mechanism whereby the approximate time at which the car reaches the zone for which the transfer is issued will be stamped thereon and, the time being variable for different zones, yet only necessitating the operation of a single zone lever by the operator to set the mechanism of the machine in operation to properly stamp and issue the transfer.

It is also an important object of this invention to provide a transfer issuing machine employing dating, numbering and time-stamping mechanisms, all set in operation by operation of any one of a number of particular zone levers, and with indicating means visible from the exterior of the machine to show the setting of the time-stamping and dating wheels to the operator.

It is a further important object of this invention to provide a universal transfer issuing machine adapted for use by any traction company and on various lines of the same company by the mere adjustment of mechanisms within the machine and without altering the construction thereof.

It is finally an object of this invention to provide a transfer issuing machine wherein the various impressions made upon a transfer to be issued may be changed by adjustment to suit the requirements of service.

Other and further important objects of this invention will be apparent from the disclosures in the drawings and specifications.

The invention (in a preferred form) is illustrated in the drawings and hereinafter more fully described.

Drawings.

Figure 1 is a front elevation of a device embodying the principles of our invention.

Figure 2 is a side elevation thereof.

Figure 3 is a top plan view of the machine.

Figure 4 is a front view of the interior of the machine with the casing removed.

Figure 5 is a side view of a portion of the mechanism of the machine with the casing removed and parts broken away.

Figure 6 is a view of the opposite side of the machine with the casing removed and parts broken away.

Figure 7 is a vertical section taken through the machine substantially on line 7—7 of Figure 4.

Figure 8 is an enlarged rear view of the mechanism constituting the upper portion of the machine.

Figure 9 is a fragmentary view of the strip of transfer paper showing the impression thereon for one transfer to be issued.

Figure 12 is a detail section taken on line 12—12 of Figure 7.

Figure 13 is a detail section taken on line 13—13 of Figure 7.

Figure 14 is an elevational view with parts in section of the actuating cams for the presser feet and knives shown respectively in Figures 12 and 13.

Figure 15 is a sectional detail on line 15—15 of Figure 6.

Figure 16 is a sectional detail on line 16—16 of Figure 6.

Figure 17 is a fragmentary view of a portion of the mechanism in Figure 15.

Figure 18 is a fragmentary detail view illustrating the operating levers for starting the machine shown in the assembly view in Figure 5.

Figure 19 is a detail view showing the drive for the serial number wheels.

Figure 20 is a detail view of a part of the mechanisms shown in Figure 18.

Figure 21 is a detail view showing the Geneva gear for controlling the day register wheels.

Figure 22 is a top plan view of the frame of the intermediate mechanisms of the machine structure.

Figure 23 is a sectional detail on line 23—23 of Figure 22.

Figure 24 is an elevation of the "direction" shaft of the machine.

Figure 25 is a detail section on line 25—25 of Figure 4.

Figure 26 is a fragmentary top plan view of the driving and the gear shifting mechanism for the "out" and "in" trips.

Figure 27 is a side view thereof.

Figure 28 is a sectional detail on line 28—28 of Figure 26.

Figure 29 is a detail view of a pawl mechanism forming a part of the cumulative register wheels.

Figure 30 is an opposite view thereof.

Figure 31 is a fragmentary view illustrating the situation of the notch for the pawl in the gear mechanisms of Figures 29 and 30.

Figure 32 is a fragmentary view showing the locking pawl for the Geneva mechanism.

Figure 33 is a detail view partly in section of the Geneva element controlling the "day" number wheels.

Figure 34 is a detail view of a mutilated gear forming part of the drive shown in Figure 6.

Figure 35 is a fragmentary interior view of certain of the shafts of the registering wheels.

Figure 36 is a detail section on line 36—36 of Figure 6.

Figure 37 is a sectional detail on line 37—37 of Figure 35.

Figure 38 is a detail view showing the gears operated by the actuation of a zone lever.

Figure 39 is a sectional view illustrating the development of the shaft and gear of the registering means.

Figure 40 is a sectional view showing the development of the shaft and gears and lever mechanism of the registering mechanism.

Figure 41 is a top plan view of the machine with the cover casing removed.

Figure 42 is a side view of the mechanisms at the upper end of the machine.

Figure 43 is a top plan view of the base portion of the machine.

Figure 44 is a fragmentary interior view of the "in" and "out" shift lever.

Figure 45 is a detail view of the lost-motion connection for a zone lever.

Figure 46 is a view of one of the "setting" sleeves for the indicating and impression mechanism.

Figure 10:
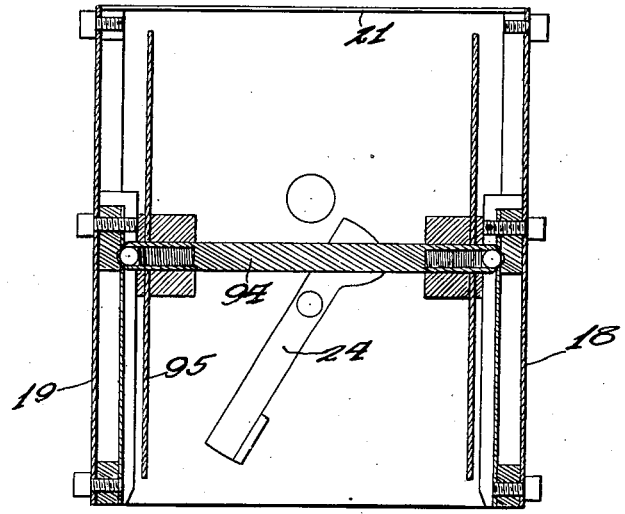
Figure 10 is a sectional detail substantially on line 10—10 of Figure 7.

Figure 47 is a top view thereof.
Figure 48 is a plan view of the indicating date wheel.
Figure 49 is a section on line 49—49 of Figure 48.
Figure 50 is a section on line 50—50 of Figure 48.
Figure 51 is a detail of the spring lock mechanism.

*Description.*

As illustrated in Figures 1, 2 and 3, the transfer issuing machine consists of a base section 1, within which is housed and concealed an electric motor drive and the electrical leads therefor are shown in Figure 2 indicated by the reference numeral 2. Mounted upon the base 1 is an intermediate section comprising front base plate 3 provided with a hinged door 4 and fitted thereto is a three-walled casing 5, together with the frame plate 3, affording a complete closure for the mechanisms within. Fitted over the intermediate casing section 3—5 is a cover member 6, which is held attached in position by two bolts 7, which extend through the overlapping portions of the cover section 6 and the upper margin of the intermediate casing section 3—5. The top cover section 6 is provided with a plurality of slots to permit projection upwardly therethrough of seven levers denoted respectively by the reference numerals 8, 9, 10, 11, 12, 13 and 14. Said top cover section 6 is also provided with two view apertures 15 and 16, and the lower base section 1 is provided with a plurality of vent apertures 17 to cool the driving means within. The particular mechanism enclosed within the base 1 forms no part of the present invention and hence there is no illustration thereof.

The mechanisms which are enclosed within the intermediate casing section 3—5 comprise a frame consisting of two side walls 18 and 19 respectively, which are joined by a bottom plate 20 and also at the rear edges are connected by rectangular spacer plates 21 and 22, each of which is cut away to afford substantially a skeleton rectangle. Said frame plates 18 and 19 are secured to the frame plate 3 when the machine is assembled so that the intermediate frame mechanism of the machine may be handled as a unit.

As shown clearly in Figure 7, the bottom plate 20 is provided with an aperture to receive a locking lug 23 therethrough which forms a part of the base section 1, and a lever 24 is pivoted on said bottom 20 to interlock with the lug aforesaid. Additional lugs (not shown) are provided on the base section 1 to engage other apertures in the frame plate 20. Attached upon the frame plate 18, as shown clearly in Figures 4 and 5, is an angle bracket 25 provided with a step bearing 26, in which an upright or vertical shaft 27 is journalled. The lower end of said shaft 27 is provided with a pinion 28, which is adapted to mesh with a driving pinion (not shown) spaced above the top surface of the base section 1 and driven by the mechanisms therewithin.

Said vertical shaft 27 at its upper end is provided with a clutch element 32, which is fixed to rotate with said shaft but is slidable thereon and is held thrust upwardly by a spring 33 coiled about said shaft. Also secured upon the frame plate 18 is an angled bracket 34 which affords a bearing for the upper end of said shaft 27, and journalled upon the upper end of the shaft 27 is another clutch element 35 for coaction with the clutch element 32, and secured thereon is a helical pinion 36. Journalled transversely between the frame plates 18 and 19 and projecting beyond the frame plate 18 and journalled in an extended portion of the bracket 34 is a shaft 37. Journalled on said shaft 37 between the frame plate 18 and the bracket 34 is a helical pinion 38 in mesh with the helical pinion 36 and a sleeve or hub extension 39 of said pinion extends inwardly on said shaft toward the frame plate 18, and mounted adjacent thereto on said sleeve is a toothed ratchet wheel 40. Secured upon said shaft 37, adjacent the ratchet wheel 40, is a disk 41, and pivoted thereon is a pawl 42 normally impelled toward the ratchet wheel 40 by means of a spring 43, connected to the tail of said pawl, as clearly shown in Figure 18.

Pivoted upon a stud 44, secured in frame plate 18, is a small lever 45 having a pin 46 in one end thereof which projects inwardly in a position to contact the tail of pawl 42, as shown in Figure 18, and hold the pawl normally out of engagement with the ratchet wheel. The other end of the lever 45 is provided with a pin 47 seated in a notch 48 in the lower end of a lever 49, the upper end of which is attached to a crank 50 secured upon a shaft 51, hereinafter described. A spring 52 is coiled about the shaft 51 and operates normally to hold said crank 50 and lever 49 downwardly with the upper end of the notch 48 bearing upon the pin 47 so that said lever 45 normally holds the pawl 42 in retracted position.

The shaft 37 extends entirely through the frame of the machine and projects beyond the other frame plate member 19, as clearly shown in Figures 4 and 7. Rigidly secured on said shaft 37 beyond the outer surfaces of each of the respective frame plates 18 and 19, are gears 53, and each thereof meshes with one or two gears 54, which are journalled on stud shafts 55 on the exterior of said plates. Similarly, each of the gears 54 mesh with gears 56, also journalled upon stud shafts 57 secured upon the outer surfaces of the respective frame plates 18 and 19. Each of the gears 54 has a cam 58 secured thereto for rotation therewith, and similarly each of the gears 56 has a cam 59 secured thereto. Also secured upon the shaft 37, between each of the gears 53 and the surface of the frame plates 18 and 19, are mutilated gears 60, each of which is in mesh with one of two mutilated pinions 61, which are formed upon the outer ends of short shafts 62 journalled transversely through the frame plates 18 and 19. Adjacent the interior surface of each of the respective frame plates 18 and 19 said shafts 62 are provided with pinions 63, as shown in Figure 7.

Journalled transversely between the respective frame plates 18 and 19, as clearly shown in Figures 4 and 7, are a plurality of shafts 64, 65, 66 and 67. Secured near the ends of the shaft 64, interior of the frame plates 18 and 19, are gears 68, each meshing with the pinions 63, and rigidly attached thereto are small pinions 69. Each of the small pinions 69 meshes with a gear 70, there being two thereof on the shaft 65, and associated with each of the gears 70 are wide pinions 71. Each of the pinions 71 meshes with one of two large gears 72 secured on a sleeve 73 slidable upon a shaft 66, and each of the gears 72 is adapted to mesh with one of two wide gears 74 secured upon the shaft 67.

Each of the pinions 74 meshes with a gear 75, as shown in Figure 4, and secured upon the same short shafts as said gears 75, are small bevel pinions 76, each in turn meshing with one of two bevel pinions 77 secured upon shaft 78 journalled in brackets 79 secured upon the exterior of the respective frame plates 18 and 19. Also secured upon the shafts 78 and disposed between the supporting brackets 79 are ribbon rolls 80 for an ink ribbon 81. From the description mentioned of the slidable gears 72, it is obvious that only one of the ribbon rolls 80 receives a drive at any one time and consequently the other thereof becomes a feed roll. Secured upon the end of each of the shafts 78 is knurled head 82, whereby the idler ribbon roll may be adjusted. Said ribbon 81 is trained upwardly from the respective rolls 80 over idler rolls 83, and transversely across the frame structure through slots provided therefor in the frame plates 18 and 19. This structure is clearly shown in Figure 15.

An automatic mechanism is provided for interchanging the drive from one ribbon roll 80 to the other, so that after a certain amount of ribbon has been unwound from one roll, the drive is transferred to the other thereof to reverse the drive to the ribbon and rewinding it on the other roll. For this purpose shafts 84 are journalled in brackets 85 provided on inner surface of each of the frame walls 18 and 19, and secured upon each of said shafts, is a pair of arms 86 impelled by springs 87 towards the respective roll 80, as shown in Figure 15. Rollers 88 are journalled in the upper end of each of said arms 86 to bear upon the ribbon wound upon said rolls. Also secured upon said shaft 84, as shown clearly in Figure 4, are upwardly extending arms 89, the upper ends of which contact the outer surfaces of the respective gears 72, which are secured to the slidable sleeve 73. As shown clearly in Figure 15, said sleeve 73 is provided with an extension 90 projecting beyond the frame plates 19, and provided with two grooves therein either one of which is adapted to be engaged by a spring-impelled detent 91, shown in Figure 6, impelled by a spring 92 and mounted in a bracket 93 secured upon the exterior of the frame plates 19, thus when the respective levers 89 shift the slidable gears 72 the moment the same are about to pass out of mesh with one of the gears 74, the spring detent serves to continue the sliding movement thereof to snap the same to its opposite extreme of movement so that the other pair of gears 72 and 74 are brought into mesh.

As shown in Figure 7, a reel 94 is provided to receive a roll of paper thereon, the side flanges or disks being denoted by the reference numerals 95 and said reel is journalled between the frame plates 18 and 19. Journalled at the upper end of the respective frame plates 18 and 19 and disposed therebetween, as shown in Figure 4, is a paper feed roll 96 of yieldable material to receive a strip of paper from the reel 94—95, and the shaft of said feed roll 96 is provided with gears 97 at its ends, which mesh with the respective gears 68. The paper is shown in Figure 7 mounted upon the reel 94—95 and trained over the feed roll 96 and over a guide plate 98 through an outlet aperture 99. A co-acting idler roll 100 of two sections on the same shaft is provided which bears upon the feed roll 96, and said roll 100 is spring mounted in an upper frame structure composed of vertical frame plates 101 and 102, secured to a plate 103, which is rigidly secured to the side frame plates 18 and 19.

Figure 11:
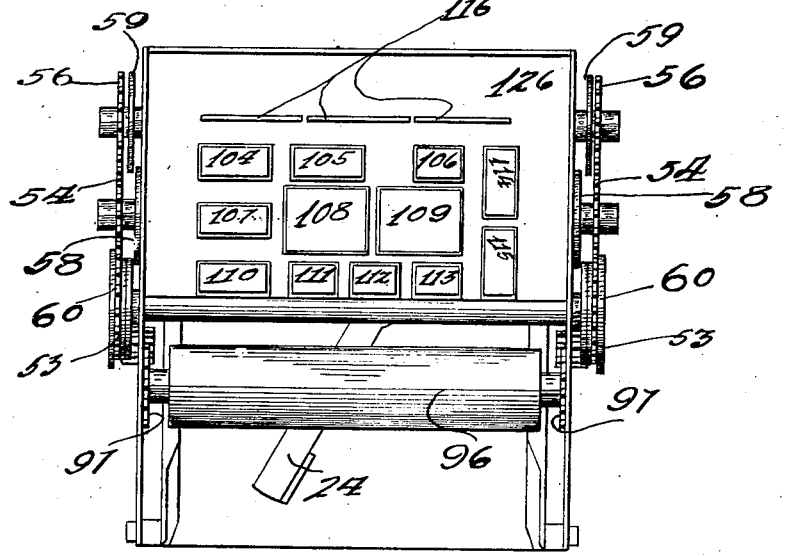
Figure 11 is a detail top plan view of the intermediate frame structure of the machine.

Figure 11 shows a top plan view of the aforesaid plate 103, and the same is provided with a plurality of apertures therein to receive knives, and presser feet projected therethrough to press the paper upwardly against impression mechanism hereinafter described. The presser feet are constructed of yieldable material such as rubber and each thereof has a long vertical bar extension extending downwardly in the frame. Said respective presser feet are denoted by the referance numerals 104, 105, 106, 107, 108, 109, 110, 111, 112, 113, 114 and 115. Slots 116, three in number, are also provided in the plate 103 to receive cutting knives projected therethrough as hereinafter described. The presser feet are shown also in Figures 4, 12 and 15. As shown in Figure 12, a horizontal partition plate 117 is secured between the frame plates 18 and 19 and said plate 117 is provided with a plurality of slots therethrough to receive the tail portions of the respective presser feet slidable therein. Also slidable through said plate 117 are a pair of rods 118, each provided with a flange 119 having a coiled spring therearound denoted by the reference numeral 120 bearing against said flange and seating upon the plate 117. The lower ends of each of the rods 118 are secured in a cross-bar 121, the outer ends of which are slidably engaged through slots therefor in the respective frame plates 18 and 19. The projecting ends of the bar 121 are disposed beneath the cams 58, and said cams 58 normally hold the bar 121 downwardly against the compression of the springs 120. Attached to said rods 118 and movable therewith is horizontal flat plate 122 provided with a plurality of slots to receive the bar or tail portions of the respective presser feet slidably therethrough and, as shown in Figures 12 and 15, each of said bars is reduced in width to afford a ledge 123, which rests upon the plate 122, and adjustable slotted weights 124 are provided engaged upon the reduced width portion of each of the presser feet by means of set screws 125, as shown clearly in Figures 12 and 15. The weights 124 normally hold the respective presser feet retracted downwardly so that the same are supported upon a stationary horizontal plate 126 and plate 122. When the bar 121 springs upwardly with the rods 118 under the stress of the springs 120, the plate 122 moves upwardly with said rod carrying all the respective presser feet upwardly with a sudden movement, and immediately thereafter the rotation of the cams 58 continuing, the bar 121 is retracted and with it the plate 122 upon which the presser feet rest, so that the same move downwardly out of the dotted line position shown in Figure 12.

Also slidably mounted through the stationary plates 117 and 126, as shown in Figure 13, are three cutting knives 127, 128 and 129, the upper cutting edge of each of which is inclined and said knives are secured at their lower end to a cross-bar 130. Said cross bar 130 has secured thereto guide rods 131, which extend slidably through the plates 117 and 126 and at their upper ends are provided with another cross-bar 132, which is also secured to each of the respective knives or plates 127, 128 and 129. A pair of compression springs 133 are coiled around each of the rods 131, bearing at their upper ends beneath the cross bar 132 and seated at their lower ends upon the stationary plate 117, so as to operate normally to thrust said rods 131 and cross-bar 132 upwardly to carry the cutting knives therewith. However, said knives are normally held retracted by the cams 59, which bear upon the extended ends of the cross-bar 130, the ends of which project through slots in the plates 18 and 19, and upon release from said cams 59, said springs throw the respective knives suddenly upwardly to sever the paper at three points.

The mechanisms hereinbefore described are so timed that an impression is first made on a portion of the paper by operation of the presser feet which thrust the paper against type members hereinafter described. Then the feed roller is operated to feed the strip forwardly so that the impressed portion is projected through the discharge slot in the machine, and thereafter the knives are released to sever the printed portion of the paper strip.

As shown in Figure 7, stationary knives 133ª are attached upon the frame plate 103 in a position to coact with the knives 127, 128 and 129 to almost completely sever the strip of paper passing therebetween.

As shown in Figure 18, the mechanisms for entrainment of the power drive through the pawl 42 and ratchet wheel 40 are brought into operation by actuation of the lever 50 of the shaft 51. Said shaft 51 is journalled between the frame plates 101 and 102, as shown in Figures 7 and 4, and attached over the end of said shaft 51 is an end bracket plate 134, as shown in Figure 5. Said shaft 51, as shown clearly in Figure 18, is normally disposed in up position owing to the stress of the spring 52. At a plurality of points on said shaft 51 are a number of sleeves 135, each provided with a lug projection 136, as shown in Figure 4, and each sleeve is rigidly secured to said shaft and each projecting lug is disposed in a position of alignment beneath one of the respective zone levers 9, 10, 11, 12, 13 and 14. Each of the zone levers is provided with a downwardly extending pin 137, which at the extreme limit of downward movement of the lever, serves to contact one of the projecting lugs 136 and thereby operate the shaft 51 to release the pawl 42 and permit entrainment of the drive. It is evident, therefore, that all mechanisms which are operated by the respective zone levers are first operated to a predetermined "set" position and with the final movement of a zone lever, the entrainment of the drive of the machine is effected. Intermediate the respective sleeves 135 on the shaft 51 are a plurality of collars 138, which are journalled upon the shaft 51 and therefore may maintain a stationary position when the shaft 51 is operated.

Secured upon the outer end of the shaft 51, as shown in Figure 5, is a stop element 139 having a tooth which contacts against a shaft 140, which is journalled between the frame plates 101 and 102, and the end bracket plate 134. Said shaft 140 is shown in detail in the sectional view in Figure 39.

Pinned to the shaft 140 at points therealong intermediate the respective zone levers are cylindrical members 141 and a grooved member 142 is also secured to said shaft 140 and to the zone lever 9. Similarly rigidly associated with the other zone levers 10, 11, 12, 13 and 14 are other grooved elements 143, and coiled about each of the grooved elements 143 are springs 144, as shown in Figure 4, with one end of each thereof bearing upon and engaged in a grooved member 138, on the shaft 51. As is readily apparent from Figure 39, the grooved member 142 is pinned to the shaft 140 so that any movement of the zone lever 9 will cause movement of said shaft but the other grooved members 143 for the other zone levers are not pinned to the shaft but are rotatable thereon together with their respective zone levers. Means is provided between each of the grooved members 143 and the adjacent cylindrical members 141, which are pinned to the shaft, to transmit a certain amount of movement to the shaft 140 for a full movement of each of the zone levers and the amount of movement transmitted to the shaft 140 is different for each zone lever.

For this purpose each of the cylindrical members 141 at the left of a zone lever, referring to Figure 39, is provided with a projecting pin 145, which projects toward the adjacent grooved member 143, and the faces of the respective grooved members 143 are cut away different amounts, so that the time of engagement between a grooved member and the pin of a cylindrical member is different for each zone lever and consequently, since the movement of all of the zone levers is the same, the amount of movement of the shaft 140 is different for full movement of each of the respective zone levers. As shown clearly in Figure 7, each of the zone levers is provided with a pin 146 at its portion opposite to the shaft 51 corresponding to the pin 137, but the purpose of the pin 146 is to limit the upward forward movement of the zone lever under the stress of its light spring 144.

As shown clearly in Figure 7, and in the development view in Figures 39 and 40, a shaft 148 is journalled between the frame plates 101 and 102 carrying the indicating date wheel hereinafter described, and another shaft 149 is journalled between said frame plates and carries indicating time wheels hereinafter described. Another shaft 150 is journalled between the frame plates carrying the (—) impression wheels and a shaft 151 is also journalled therebetween carrying the timing wheel for impressions upon the transfer strip, as hereinafter described. Another intermediate shaft 152 is also journalled between the frame plates and is shown in the development view in Figure 39. As shown clearly in Figures 6, 38 and 39, a gear sector 153 is secured to the cylindrical element 141, which is attached upon the shaft 140 adjacent the zone lever 9. The gear sector 153 meshes with a gear 154, which is provided with a long hub or sleeve extension 155 pinned to the shaft 152. Also secured upon said shaft 152 is another gear 156, which meshes with and serves to drive a gear 157, which is journalled so as to be freely rotatable upon the shaft 149. Said gear 157 is provided with a hub member 158, and together therewith is provided with a series of apertures 159 therein, as shown clearly in Figure 38. The aforesaid gear 154 meshes with an idler pinion 160 journalled upon a stud shaft 161 secured in the frame plate 102, and said idler pinion 160 meshes with and drives a gear 162, which is journalled upon the shaft 149, and, similarly to the gear 157, is provided with a hub member 163 and a plurality of apertures 164.

Feathered upon the shaft 149, between the gears 157 and 162, is a clutch member 165 provided with projecting pins 166, at each end thereof which are adapted to engage with one or the other of the gears 157 or 162 in the apertures therein according to the direction in which said slidable plug element is moved. Said gears 157 and 162 rotate in opposite directions owing to the fact that one thereof is driven through an idler pinion 160. Thus the shaft 149 will be operated in a forward or reverse direction according to which of the gears 157 or 162 the clutch element 155 is engaged.

For the purpose of manually shifting said clutch element 155 into the desired position, a groove 167 is provided therein and engaging in said groove is a helically bent cam or rib 168. Said cam 168 comprises a substantially semicircular strip of metal forming an integral part of a disk 169, which is secured to a gear 170, and together therewith attached to a sleeve 171, which is journalled upon the shaft 152. The angularity of the bent semicircular portion 168 will cause the clutch element 165 to be shifted from one extreme position to the other for approximately one-half a revolution of the cam 168. Also secured to the gear 170 is a crank 172, which is adapted to be oscillated coincidently with oscillation of the cam 168—169 by movement of the gear 170. In order to operate these elements, a gear sector 173 is provided in mesh with the gear 170 and secured to the hub member 174 of the lever 8, so that as said small lever 8, shown in Figures 26 and 27, is operated from one extreme position to another through approximately an angle of 45 degrees, said cam 168—169 and the crank 172 are caused to move a corresponding amount. Attached between the shafts 140 and 151 at one side of the machine, as shown in Figures 6 and 27, is a plate 175. On the interior side of the said plate a spring impelled detent rod 176 is slidably mounted in guide formed by the inwardly bent lower end of the plate 175 in an inwardly struck lug 177, and a spring 178 is coiled around said detent rod normally impelling the same upwardly into one of three recesses provided therefor on the lower surface of the hub of the lever 8. Thus the detent will serve to hold said lever 8 in any one of three positions, that is in an upper extreme position, an intermediate neutral position, or a lower position shown in dotted lines in Figure 27.

The crank 172 engages in a slot 179 formed in a sector plate 180, which is journalled on the shaft 152, and disposed beyond the gear 156. A stiffening plate or bar 181 is connected upon the respective shafts 152 and 149 and is disposed between the sector plate 180 and the gear 156. As clearly shown in Figures 6 and 27, teeth are formed in the lower edge of the sector plate 180 and are adapted for coaction with a mutilated pinion 182 secured upon a short shaft 183 and disposed directly beneath the shaft 152 and journalled in the upper end of the frame plate 19.

This shaft 183 is the "direction" shaft and is shown in detail in Figure 24 and on its inner end is provided with four impression surfaces 90 degrees apart having the words North, South, East, and West on their respective surfaces. A pin 184 is provided in the extended end of said shaft 183 whereby a sleeve 185 may be engaged over the shaft with the notch in the sleeve engaging the pin and a knurled head 186 provided on said sleeve to permit a manual adjustment of said sleeve and shaft.

Figure 28 shows a spring detent mechanism and weight lever for association with said shaft 183 to hold the shaft against accidental adjustment from any one of its adjusted positions. This mechanism comprises a hollow lever 187 having a coiled spring 188 therein and detent pin 189 adapted to engage in any one of four notches 190 provided in the shaft 183, and said lever 187 is mounted adjacent the mutilated pinion 182, as shown in Figures 24 and 27.

It is apparent, therefore, that with operation of the lever 8 to cause shifting of the "direction" shaft from North to South or East to West, as for instance in making an "out" trip and an "in" trip, the clutch element 165 is also shifted to reverse the drive to the shaft 149. The operation of the shaft 149 serves to adjust the indicating time wheels which are mounted thereon and as well to drive the impression time wheels together with the indicating and impression dating wheels hereinafter described.

As shown in the development view in Figure 40, a sleeve 191 is mounted on the shaft 149 between the frame plates 101 and 102, and a spacing sleeve 192 is also mounted on said shaft abutting the ends of the sleeve 191. Pinned to said sleeve and also to the shaft 149 is a "minute" indicating time wheel 193 having five minute intervals marked thereon from zero to fifty-five, and secured adjacent thereto is the gear 194 directly in mesh with an idler 195 on a shaft 196, and said idler in turn meshes with a gear 197 secured to an impression "minute" time wheel 198, also having minute intervals of five minutes each from zero to fifty-five on the surface thereof. Said gear 197 and impression gear 198 are journalled upon the shaft 151.

As shown in Figure 40, mounted at the left of the minute-indicating time wheel 193 is an "hour" indicating time wheel 199 having hours from one to twelve marked thereon and said "hour" wheel 199 receives a single advance movement of one hour for each revolution of the minute wheel 196. The cumulative movement between the "minute" wheel 196 and the "hour" wheel 199 is effected by a conventional form of mechanism and consists of a shaft 200 journalled between the frame plates 102 and 101, provided with a mutilated idler pinion 201 adapted to be meshed by a mutilated gear 202 secured to the "minute" wheel gear 194. Similarly the "hour" wheel 199 is provided with a mutilated gear 203, also adapted to mesh with the idler mutilated pinion 201, so that for each revolution of the "minute" wheel 196 a movement is imparted to the pinion 201, which in turn transmits a movement to the "hour" wheel 199 to advance or retract the same a distance of one hour according to the direction of rotation of the "minute" wheel. Another mutilated pinion 204 is pinned to said shaft 200, and for each complete revolution of twelve hours of the "hour" wheel 199, imparts a movement to the mutilated pinion 204 which in turn operates the shaft 200. Another pinion 205 is secured upon the shaft 200 and meshes with a gear 206, which is secured to an indicating wheel 207 journalled on the sleeve 191 of the shaft 149, and said indicating wheel 207 is provided alternately with indications both a. m. and p. m. so that for each complete revolution of the "hour" wheel 199 from 12 to 12, an advance from a. m. to p. m. or from p. m. to a. m. is made on the indicating wheel 207.

This a. m. and p. m. wheel 207 serves also to adjust an impression a. m. and p. m. wheel 207ª to operate simultaneously with the movement thereof, and said latter wheel is journaled upon the shaft 151 and is provided with a gear 208, which meshes with an idler pinion 209 on the shaft 196, which in turn connects with the gear 206 attached to the indicating wheel 207 through a sleeve 209ª and a pinion 209ᵇ thereon.

Similarly the "hour" wheel 199 with each advance or retractive movement thereof serves to advance an impression "hour" wheel 210 journalled on the shaft 151, and provided with a gear 211 in mesh with an idler pinion 212, which in turn meshes with the gear 203 attached to the indicating "hour" wheel 199.

Journalled upon the outer end of the shaft 151, beyond the frame plate 102, is a "line number" wheel 213 having figures thereon for impressing a "line number" upon a transfer. Said line number impression wheel 213 is provided with a gear 214, which may be used with auxiliary adjusting or setting mechanism (not shown). The plate 98, as shown in Figure 22, has six apertures therethrough with beveled edges over which the impression wheels are mounted, as shown in Figure 7.

Each transfer receives an impression denoting for what zone the transfer is to be used and the number impressed depends upon which one of the respective zone levers is operated. As pointed out, all of the respective zone levers, owing to the loose connection between all thereof, with the exception of lever 9, and the shaft 140, operate the gear sector 153 different amounts for the purpose of impressing different times upon the transfer in accordance with the zone for which the transfer is issued. Accordingly a "zone" impression wheel 215, having a series of numbers thereon in successive order, is provided and is shown secured upon one end of the shaft 150 in Figure 40. Said shaft 150 on its other end is provided with a gear 216 secured thereto and said gear 216 meshes with a pinion 217 secured to a sleeve 218 journalled on a stud shaft 219 projecting outwardly from the frame plate 101. Also secured upon said sleeve 218 is a pinion 220, which is in mesh with a large gear 221 secured upon the shaft 152, as shown in Figures 5 and 39. As already pointed out, the shaft 152 receives a direct actuation through its gear 154 from the gear sector 153, so that the "zone" impression wheel 215 is operated an amount according to the movement of the shaft 152, which is of course determined by the particular zone lever which is operated.

The next consideration is the operation of the indicating and impression date wheels. An important feature of co-active relation between the date wheels and the time wheels, is due to the necessity of causing an advance movement of the date wheels for movement of the time wheels past twelve o'clock midnight, so that any transfer issued before 12 o'clock midnight to be used in a zone at a time after 12 o'clock midnight must receive impressed thereon the numeral for the next succeeding date. Furthermore, it is necessary on the last day of the month to insure a cumulative movement of the date wheels whereby the "month" wheel is moved forwardly when a time impression is to be made after 12 o'clock midnight coincident with a shift of the "day" wheel from the last day of the month to the first day of the next succeeding month.

As shown in the development view in Figure 40, the shaft 148 carries a "month" indicating wheel 222 and two "day number" or numeral-indicating wheels 223 and 224 respectively, there being no indicating "year" wheel. The indicating numeral wheel 224 has figures thereon from zero to nine and, as shown, together with the other date wheels 222 and 223 is journalled upon a sleeve 225 mounted on the shaft 148.

As mentioned heretofore, the shaft 200 is operated by the "hour" wheel 199 every twelve hours to shift the a. m. and p. m. wheel 207. Means are provided for utilizing the movement of the shaft 200 for every second movement or every 24-hour movement thereof to actuate the date wheel. For this purpose a pair of mutilated pinions 226 and 227 respectively integrally connected are feathered upon the outer end of the shaft 200 so as to be slidable thereon and rotatable therewith. The space or groove between the respective pinions 226 and 227 is engaged by a disk 228, which is secured upon a slidable shaft 229 journalled between the frame plates 101 and 102. Also mounted upon the shaft 229 is a pinion 230 slidable with said shaft, and a pair of triangular star wheels 231 and 232 are mounted on said shaft 229 for a purpose hereinafter pointed out. As shown in Figure 5, said disk 228 is engaged by a notched projection 233, which is secured upon the outer end of a slidable rod 234 mounted between the frame plates 101 and 102. Journalled between the frame plates 101 and 102 adjacent the shaft 229 and rod 234, as shown in Figures 7 and 40, is a shaft 235, sad shafts 200, 229 and 235 being shown in detail in Figure 35.

The slidable actuating rod 234 is provided with two grooved portions 235ª at its end projecting beyond the frame plate 102, as shown in Figure 4. Secured on the frame plate 102 adjacent thereto is a casing 236 containing a spring impelled detent 237 normally impelled against the portions 235ª of the rod 234 to hold the rod in either one of its moved positions and also to insure complete movement thereof to an extreme position after movement past dead center. Rigidly secured upon the slide rod 234 is an arm 237ª, which engages over the hub portion 238 of a pair of gears, one having the reference numeral 239ª and the other, a mutilated gear 240ª, which are slidably mounted upon the shaft 235, as shown, so as to move in the dotted and full line positions in Figure 35 in accordance with movement of the shaft 229 and slide rod 234. Said gear 240ª, as shown in Figures 33 and 35, has two rows of teeth at each end with one tooth 240ᵇ, common to both extending entirely across the gear.

The purpose of the two triangular star wheels 231 and 232 on the slidable shaft 229 is for coaction with a double helical cam member 238ª mounted upon the shaft 200. Said cam element 238ª is secured upon the shaft 200 and by contact with the respective star wheels serves to shift the shaft 229 and consequently the rod 234, which in turn shifts the pinions 239ª and 240ª.

As shown clearly in Figure 37, the respective star wheels 231 and 232 are offset from one another substantially at an angle of 60 degrees so that it is only possible for one star wheel to be engaged by the double cam element at any one time and that star wheel must be in a position with one of its points directed towards the cam and in the case of the other star wheel the rounded portion between the points affords clearance for the cam as it rotates therebeneath. At a time just a few days prior to the end of each month, as hereinafter pointed out, the star wheels are shifted so that first one and then the other of the star wheels comes into operation to effect a shifting of the slidable shaft 229 from a shifted position.

The two slidable mutilated pinions 226 and 227 are disposed for engagement with Geneva gears 239 and 240 respectively mounted upon the shaft 148, and having a lost motion connection and each consisting of two rigidly connected plate sections, for a purpose hereinafter pointed out. The Geneva gear 240 is pinned to the shaft 148 and the Geneva gear 239 is attached upon a sleeve journalled on said shaft. The two Geneva gears 239 and 240, which are operated by the mutilated pinions 226 and 227 respectively, provide a means for taking into account the fact that certain months of the year have only thirty days, and others thirty-one days. The mechanisms are so related that for each 24 hour movement of the hour and minute wheels, the date wheels are shifted to advance the same one day and a cumulative mechanism hereinafter described advances the month wheel in accordance with the proper number of days for that particular month.

Also mounted for rotation on the shaft 148 is a relatively wide Geneva element 241 consisting of a number of built-up plate sections and having secured thereto the number wheel 224. Said Geneva element 241 has two gear segments, one 241ª rigid therewith, and another 241ᵇ rotatable with respect thereto and connected for rotation with the shaft 148. Thus the gear segment 241ª rotates with the Geneva gear 239 and the gear segment 241ᵇ with the Geneva gear 240. These gear segments are adapted for coaction with the slidable mutilated pinion 240ª in accordance with its position upon the shaft 235. The number wheel 224 is provided with a gear 242 meshing with a pinion 243 journalled upon a shaft 244 between the frame plates 101 and 102. Said pinion meshes with a gear 245, which is secured to an impression day number wheel 246 journalled on the shaft 150. Directly adjacent the pinion 243 is a mutilated pinion 247, which is operated by the Geneva element 241 for each complete rotation thereof, and the day wheel 224 to move said shaft 244. Another pinion 248 is secured upon the shaft 244 and meshes with a gear 249 secured to the other day number wheel 223, so that for each complete rotation of the day wheel 224 the day wheel 223 is advanced one unit. Said day number wheel 223 has marked thereon only three numerals, one, two and three, in successive order one after another therearound as these are the only numbers necessary in forming the "tens" digit of the days of the month. Journalled upon a sleeve on the end of the shaft 148 beyond the frame plate 102 is a Geneva gear element 250, which engages with a mutilated pinion 251 secured upon the end of the shaft 235 also beyond the frame plate 102. Said Geneva element 250, shown in Figures 21 and 40, also engages with and is driven by a mutilated pinion 252, which is secured upon the shaft 244 on the exterior of the frame plate 102.

The "month" indicating wheel 222 is provided with a gear 253 on one side thereof and a gear 254 on the other side thereof. The gear 253 is adapted to engage with the mutilated pinion 248 and the gear 254 meshes with a pinion 255 on the shaft 244. Secured upon the shaft 235 adjacent the inner surface of the frame plate 101 is a pinion 256 meshing with the slidable pinion 230. The indicating "day" number wheel 223 serves to drive a corresponding "day" number impression wheel 257 journalled on the shaft 150 through an idler pinion 258, and similarly the "month" indicating wheel 222 drives a "month" impression wheel 259 through an idler pinion 260 meshing with a gear 254 on the "month" indicating wheel and with a gear 261 on the "month" impression wheel. Journalled on the shaft 150 is a "year" impression wheel 262 which is held in a fixed position by a pin 263 engaged through the frame plate 101 and at the end of each year is adapted to be set manually.

As shown in Figures 29 and 30, said Geneva gears 239 and 240 are each provided with a circular plate attached thereto adjacent one another denoted respectively by the reference numerals 264 and 265, and each is provided with projections 266 and 267 engaging in a cutaway portion of the opposite plate. This permits of a lost motion connection between said Geneva gears 239 and 240. A spring impelled pawl 268 is pivoted on the exterior surface of the frame plate 101 and engages between the Geneva gears 239 and 240 bearing upon the respective circular plates 264 and 265, and is adapted to engage with either of the notched projections 269.

The purpose of the lost motion connection between said Geneva gears 239 and 240 is to permit an overtravel of one relative to the other when the number of days in the month changes from a month of thirty days to a month of thirty-one days, or vice versa; that is to say, in moving from the month of September to the month of October, the gears must be so operated that the count of days for the month of October will be thirty-one instead of thirty, as for the month of September. When the shiftable gears 239ᵃ and 240ᵃ are to the left as well as the gears 226 and 227, the count will be for thirty days; that is, the Geneva gears 239 and 240 will be operated by the gears 226 and 227 such that the number wheels 223 and 224 will move simultaneously after the thirtieth day of a month to bring into position a blank space on the number wheel 223 and the numeral 1 on the number wheel 224. Of course all movements referred to in connection with the indicating number wheels 223 and 224 are duplicated on the impression wheels 246 and 257.

For a count of thirty-one days the shifting mechanisms are all shifted to the right, referring to Figure 40, owing to a rotation of the shaft 229, whereby one of the star wheels 232 is engaged by the cam 238 to move the shaft 229, gears 226 and 227, and gears 239ᵃ and 240ᵃ to the right.

The overtravel mentioned, permissible between the respective gears 239 and 240, takes place when one thereof is driven separately from the other and this can only take place when the single blank portion or cut-away tooth of each of said gears is in register with its respective driving pinion 226 or 227. In the case of thirty-one days in a month, as in October, prior to the time the mechanisms reach the thirtieth day of the month, the shift has been imposed to slide the aforementioned sliding parts 239ᵃ, 240ᵃ and other elements to the right. In order to make a count of thirty-one days it is necessary that the "tens" number wheel 223 remain at rest at the number "3" and the "units" number wheel 224 be moved from zero to one. The pawl 268, shown in Figure 29, will hold the gear 240 from accidental movement as the blank portion shown in dotted lines of the gear 240 registers with its pinion 227. However, the gear 239 will be driven by its pinion 226 and by reason of its direct connection through its sleeve with the element 241 and number wheel 224, will shift said number wheel. This movement will not be imparted to the "tens" number wheel for the reason that the slidable pinion 248 is in its right hand position out of possible mesh with the gear segment 241ᵇ, rigid with the element 241.

Now, after October follows November, another thirty-day month, and it is necessary to pick up the lost motion interval of the gear wheel 240 lost for the month of October. Accordingly, prior to adjustment of the mechanism to the last day of the month of November, the cut-away or blank portion of the gear 239 moves into register with its pinion 226 so that the gear 239 will lose a movement which, however, is imparted to the gear 240. Also prior to the adjustment of the mechanisms to indicate the last day of the month the star wheels on the shaft 229 will be so adjusted that the cam 238 causes shifting of the shiftable parts from the right to the left position; that is, to a thirty-day count position. Consequently, the gears 239 and 240 both being driven by the respective pinions 226 and 227, which, when shifted to the left, mesh with the left plate sections thereof which are complete and have no blank portions, the drive to the gears is continuous. As a result, the "tens" number wheel 223 is shifted appropriately for each revolution of the units number wheel 224 at each revolution thereof to indicate a succession of days from one to thirty.

The feature of the mechanism which determines when a shift of the mechanisms shall take place for the particular month involved, is embodied in the mutilated gear 250 journalled on the end of the shaft 148 exterior of the frame plate 102. This gear is shown in detail in Figures 21 and 40. The gear consists of three thicknesses or plates, the outer one of which has uniform teeth for coaction with a driving mutilated pinion 252 on the shaft 255. The intermediate plate has irregular spaces thereon each corresponding to one month or more, which have equal numbers of days, as for instance April and June or July and August. The back plate of said gear is provided with toothed portion in register with the notched portions of the intermediate plate section so that the mutilated pinion 251 receives a movement as a notched portion of the gear 250 moves therepast and is otherwise held from movement until the next succeeding notched portion engages therewith. The movement of the pinion 251 is, of course, transmitted to its shaft 235, which, however, does not affect the pinions 239ª and 240ª, journalled thereon, but which does serve to drive the pinion 256, which in turn drives the pinion 230 pinned upon the shaft 229. This of course shifts the star wheels 231 and 232 into position, which causes a shift and sliding movement of the shaft 229 and other mechanisms to the right or left as the case may be, by the rotation of the double cam 238.

Secured upon the top surface of the frame plate 103, as shown in Figures 22 and 23 and in Figure 4, is a long block 270 cored out on its interior to receive a rod or key 271 inserted therein having a handle 272 and with an impression block 273 on the opposite end thereof having a "conductor's number." The interior of said long block 270 is of such shape that upon first insertion of the key 271 therein the handle 272 is in the down position with the impression block 273 turned upwardly, and after the block 273 has moved inwardly sufficiently to strike a shoulder 274, said key 271 is turned through an angle of 180 degrees so that the handle 272 is in its up position and the impression block 273 turned downwardly, whereupon the key may be thrust inwardly its full amount and the number block is disposed over a proper aperture in the frame plate 103 to impress the conductor's number upon the transfer.

Means is also provided for impressing a serial number upon each transfer, shown in Figure 9, at the upper left hand corner of the figure. For this purpose, as shown in Figures 5 and 8, a frame 275 is secured upon the frame plate 103 with impression counter wheels of a usual and well-known construction so that by reciprocation of a lever 277 pivoted on a stud 278 the counter is advanced one number for each reciprocation. Accordingly, a link 279 for the purpose of actuating said lever 277 is provided projecting vertically upwards through the frame plate 103, and, as shown in Figure 19, at its lower end resting upon a cam 280, which is secured upon the shaft 37 adjacent the interior surface of the frame plate 18. Each revolution of the shaft 37 causes issuance of a transfer and consequently each revolution of the cam 280 shifts the counter wheel one number for impression upon a transfer. A locking recess 281 is provided in the link rod 279 as clearly shown in Figures 19 and 51. A swinging bolt 282 is pivoted to frame plate 103 by the screw stud 283 and is normally held engaged in the locking recess 281, when the machine is not in operation, by the leaf spring 284 as shown in Figure 51. Since the link rod 279 is held from motion by the swinging bolt 282 it is impossible to register an additional serial number by operating the machine without the conductor's key 271. Upon insertion of said key 271 the swinging bolt is engaged thereby and moved out of the recess 281 and the machine is free to operate as long as the key remains in position.

*Operation.*

The transfer issuing machine is entirely encased and the electric driving mechanism therefor may be operated at all times. In order for a conductor or operator to issue a transfer it is only necessary to pull down one of the zone levers 9 to 14 inclusive, depending upon for which zone the transfer is to be issued. The mechanism then operates to entrain the drive with the stamping mechanism which impresses the continuous strip of transfer material upwardly against the impression wheels, certain of which have been adjusted by the operation of a particular lever to indicate a time and date for which the transfer is to be used, and also the zone, and thereafter feeding mechanisms operate to feed the strip of material outwardly from the machine. Finally the cutting knives are released under spring pressure to partially sever the printed transfer from the strip so that the transfer projecting from the casing of the machine may be readily detached by the person to whom issued.

The sequence of operations which takes place when a zone lever is operated are as follows: All of the zone levers serve to operate the shaft 140, but each lever operating the shaft a different amount and the first movement of the lever operating said shaft serves to move the gear sector shown in Figure 6 to drive the gear 156, and from the gear 156 both of the gears 157 and 162, which in turn through the clutch 165, shown in Figure 39, operate the shaft 149. The shaft 149 carries the visible indicating time wheels 196—199 and 207. Thus the shifting and the time wheels and date wheels is visible to the operator through the view apertures in the top of the machine. Furthermore, the impression time wheels 198, 210 and 207 therebeneath are operated a corresponding amount. If the time to be impressed is any time prior to twelve o'clock midnight, then there is no shift in the date wheels, said wheels only moving when the time to be impressed goes beyond twelve o'clock midnight, that is, on to the a. m. time of the next day. The final movement of a zone lever by the operator serves to bring the projection 137 thereon into contact with its particular projection 136, shown in Figures 4 and 7, thereby operating the shaft 51. As shown in Figures 5 and 18, operation of the shaft 51 causes movement of the crank 50, thereby elevating the lever 49, which in turn elevates the lever 45 lowering the outer end thereof from beneath the tail of the pawl 42, so that the spring 43 impels the pawl 42 into engagement with the ratchet wheel 40, which is rotating under power thus entraining the disk 41 with the ratchet wheel for one complete rotation, as shown in Figure 20. With the entrainment of the power drive to the machine thus effected, the following series of operations automatically take place in proper sequence: The cams 58 are operated to retract the presser feet, and after sufficient rotation of the cams, the presser feet are released therefrom and are thrown upwardly under the impulse of their springs to force the paper thereabove into contact with the inked ribbon and against the shifted impression devices. Immediately thereafter said presser feet fall away and further are partly withdrawn by continued rotation of the cams 58. Thereafter the gearing which operates the feed roll 96 begins its movement to feed the impressed portion of the strip outwardly from the machine and replace the same by an unprinted portion. Coincidently with this operation the gearing to feed the inked ribbon 81 is also operated so that a fresh portion thereof moves into the field of operation of the presser feet and it is obvious that after a certain number of succession of impressions taken therefrom, a complete new portion of the ribbon will have been moved out of the field of operation and replaced by another. The final movement to take place is release of the cutting knives by the cams 59, which are timed to retract the knives during operation of the gearing and are released just after the newly impressed portion of the strip has been fed forwardly and outwardly from the machine ready to be severed.

In the foregoing specification it is to be understood that the term "zone" is intended to convey the broad meaning of "zone, or intersecting lines", and that "zone levers" are actuating levers used for controlling the issue of transfers for said zones or intersections.

We are aware that numerous details of construction may be varied through a wide range without departing from the principles of this invention, and we therefore do not purpose limiting the patent granted otherwise than necessitated by the prior art.

*Claims.*

1. A transfer-issuing machine comprising means for feeding a continuous strip of material therethrough, impression devices to impress characters on a portion of said strip, and a plurality of levers operatable to vary the position of the impression devices and each lever serving to set the machine in operation for impression and discharge of a certain portion of the strip.

2. In a machine of the class described means feeding a strip of paper therethrough, impression devices adjustable to vary the characters or impression upon said strip, a plurality of levers selectively operatable to shift said devices, and power mechanism entrained by operation of any one of said levers to cause impression of the characters on the paper and discharge of the printed portion thereof from the machine.

3. In a machine of the class described, means feeding paper therethrough, impression devices adjustable to position different ones thereof in impressing position, a plurality of levers adjustable to shift said impression devices selectively according to the lever operated, and a power mechanism for the machine set in operation by movement of any one of said levers to cause an impression of said devices to be made on the paper and discharge of the printed portion of paper from the machine.

4. In a machine of the class described means feeding a strip of paper therethrough, severing devices for said paper, impression means adjustable to impress different characters upon the paper, a plurality of levers operatable selectively, adapted to shift the impression devices for impression of certain groups thereof upon the paper, means moving the paper against said impression devices, and a power mechanism for operating the machine set in operation by any one of said levers.

5. A machine of the class described comprising means feeding paper therethrough, impression devices, means moving the paper against said impression devices, means feeding the paper therepast after an impression, cutting knives for partially severing the impressed portion of the paper, and a plurality of levers each selectively operatable to shift said impression devices prior to an impression taken therefrom, each of said levers operating to set the machine in operation by actuation thereof.

6. A machine of the class described comprising a power mechanism, means for feeding a strip of material through the machine, impression devices, means moving a portion of said material against said impression devices, knives for severing the impressed portion of the material, a plurality of levers independently operatable to shift said impression devices to change the character of the impression upon the material, and a connection between said levers and the power mechanism whereby the latter is set in operation for actuation of any one of said levers.

7. In a machine of the class described a plurality of impression devices, manually adjustable means for changing the adjustment of said devices, feeding means set in operation by operation of said manual means after adjustment of said devices to feed a material therepast, and severing means operatable after the feeding movement of said material to sever a portion therefrom.

8. In a machine of the class described means feeding the paper therethrough, impression devices, a plurality of means selectively operatable to operate said devices, means set in operation by actuation of any one of said means to cause an impression on the paper to be made by said devices, feeding means set in operation by operation of any one of said first-mentioned means to feed the paper after impression, and cutting means actuated after feeding movement of the paper to sever the impressed portion thereof.

9. In a machine of the class described means feeding the paper therethrough, impression devices selectively operatable, a plurality of means selectively operatable to operate said devices, means set in operation by actuation of any one of said means to cause an impression on the paper to be taken from said devices, and feeding means set in operation by any one of said means to feed the paper after impression.

10. A transfer-issuing machine adapted for zone use comprising a plurality of zone levers, impression devices operatable in accordance with the actuation of said respective zone levers, and issuing means set in operation by actuation of any one of said zone levers to issue a transfer impressed by said devices.

11. A zone transfer-issuing machine comprising impression devices, said devices consisting of time and date impression means, and a plurality of levers, each apportioned to a particular zone and each operating the impression devices appropriately, means set in operation to feed a strip of material through the machine after operation of any one of said levers to issue the impressed portion of the material and means for partially severing the material after impression thereof.

12. In a machine of the class described a plurality of impression devices, means moving a strip of material therebeneath, means thrusting the material toward said impression devices to receive an impression therefrom, means adapted to feed the material after an impression, means severing the impressed portion of the material, and a plurality of selectively operatable levers for adjusting the impression devices and setting the impression, feeding, and severing mechanisms in operation.

13. In a machine of the class described impression devices, a plurality of means for adjusting the same, means adapted to feed the material into impressing position beneath said devices, means moving the material toward said devices to receive an impression therefrom, severing means to sever the impressed material, and a power mechanism for the machine set in operation by actuation of any one of said adjusting means.

14. In a machine of the class described a plurality of selective operatable zone levers, impression devices operatable thereby differentially in accordance with the lever operated, a power mechanism for the machine, and means for entraining the power drive for the machine by operation of any one of said zone levers.

15. In a machine of the class described adjustable impression devices, means operatable to move a paper thereagainst, a power drive for the machine, a plurality of selectively operatable levers for adjusting said impression devices differentially in accordance with the lever operated, and connections beween said power drive and said levers whereby actuation of any one thereof entrains the power drive to operate the impression mechanisms.

16. In a machine of the class described, time and date-impression devices, a plurality of zone levers each adapted to operate said time devices appropriately, a cumulative drive between said time devices and date devices for actuation of the latter by the former, a power connection to said drive and time and date indicating means coactively associated with the said impression devices to denote the adjustment thereof.

17. In a machine of the class described, adjustable time impression wheels, time indicating wheels associated therewith, a plurality of levers each adapted to adjust said wheels a different amount, and means for impressing a transfer against said time impression wheels and a power drive entrained by the adjustment of the levers for operating said indicating and impression wheels.

18. In a machine of the class described, time impression wheels, a plurality of zone levers each adapted to operate said time impression wheels a different amount, a zone wheel operated appropriately in accordance with the zone lever operated, means for impressing a paper against said zone and time impression wheels and an inking ribbon engaged between the paper and the impression wheels.

19. In a machine of the class described, time and date means, a plurality of mechanisms for adjusting the same differentially in accordance with which one of said mechanisms is operated, means causing an impression to be taken therefrom upon a portion of paper, and a power mechanism to operate said latter means and entrained by operation of any one of said mechanisms.

20. In a machine of the class described, shiftable impression devices, a plurality of levers for shifting the same, each adapted to shift said devices differently, a power mechanism to cause an impression to be taken therefrom on a portion of paper, and means to entrain said power mechanism by actuation of any one of said levers.

21. In a machine of the class described, timing and dating devices, a plurality of levers shiftable selectively to shift said time and dating devices, zone member means having one number appropriated to each lever, and power driven means causing an impression to be taken from said zone number and timing and dating means and devices immediately after shifting of any one of said levers.

22. In a machine of the class described a plurality of impression devices, a plurality of levers selectively operatable for shifting said devices differentially in accordance with the lever operated, means feeding a continuous strip of paper through the machine, mechanisms impressing said paper against said impression devices to receive an impression therefrom immediately after operation of a lever, and a power mechanism entrained for operation to operate said latter means and mechanisms upon operation of any one of said levers.

23. A transfer issuing machine comprising time impression means, date impression means, and a mechanism for operatively connecting said means to cause the proper dating of a transfer issued on the last day of the month to be used on the first day of the succeeding month.

24. A transfer issuing means comprising time impression means, a plurality of date impression means, and a shifting mechanism to cause said date impression means to be actuated to properly date a transfer issued on the last day of the month to be used on the first day of the succeeding month.

25. A transfer issuing machine comprising time impression means and separate date impression means for months of unequal length.

26. A power driven transfer issuing machine comprising time impression means, and separate date impression means for months of unequal length inter-connected therewith.

27. A transfer issuing machine comprising time impression means, a plurality of separate date impression means, and an automatic shifting mechanism for selectively connecting the date impression means with the time impression means.

28. A transfer issuing machine comprising time impression means, date impression means for months of different lengths, a shiftable mechanism for selectively bringing said date impression means into operation, and a cam for shifting said mechanism.

29. A machine of the class described comprising time impression means, date impression means for months of different lengths, means for selectively bringing said date impression means into operation, and a mechanism for controlling said selecting means.

30. A transfer issuing mechanism comprising time impression means, date impression means for months of different lengths, means for selectively bringing said date impression means into operation, and a mutilated gear for controlling said selecting means.

31. A machine of the class described comprising time impression means, separate date impression means for months of different lengths, a Geneva gear for controlling the operation of each of said date impression means, and a lost motion connection between the Geneva gears.

32. A transfer issuing machine comprising time impression means, separate date impression means for months of different lengths, a shifting shaft for selectively connecting said date impression means for operation, star wheels on the shifting shaft, and a rotatable cam adapted to engage the star wheels to shift said shaft.

33. A transfer issuing machine comprising time impression means, separate date impression means for months of different lengths inter-connected with said time impression means, means for controlling the operation of each of said date impression means, and a lost motion connection between said controlling means.

34. A transfer issuing machine comprising mechanisms for impressing a time and date upon a transfer, a serial number impressing mechanism operatively connected therewith and means adapted to engage said serial number impressing mechanism to lock all of said mechanisms from operation.

35. A transfer issuing machine comprising means for impressing a time, date and serial number upon a transfer, means for locking said means out of operation, a device for rendering said locking means inoperative, and means associated with said device for impressing a conductor's number upon the transfer.

36. A transfer issuing machine comprising a plurality of impression devices, a power drive for operating the same, and means movable in one direction for adjusting said impression devices and in another direction for connecting the same for operation by the power drive to impress, sever and issue a transfer.

In testimony whereof, we have hereunto subscribed our names in the presence of two subscribing witnesses.

HUGO J. BAUR.
ERNEST H. THOMPSON.

Witnesses:
LAWRENCE REIBSTEIN,
OSCAR HARTMANN.